United States Patent
Wang et al.

(10) Patent No.: US 12,092,587 B2
(45) Date of Patent: Sep. 17, 2024

(54) METHODS AND DEVICES FOR PROCESSING AND RETRIEVING DEFECT INFORMATION OF PRODUCT

(71) Applicants: Beijing Zhongxiangying Technology Co., Ltd., Beijing (CN); BOE Technology Group Co., Ltd., Beijing (CN)

(72) Inventors: Haijin Wang, Beijing (CN); Chuan Wang, Beijing (CN); Tian Lan, Beijing (CN); Jianmin Wu, Beijing (CN); Yu Feng, Beijing (CN); Hong Wang, Beijing (CN); Yu Wang, Beijing (CN); Fan Zhang, Beijing (CN); Jiawei Ren, Beijing (CN); Jing Xue, Beijing (CN); Jianfeng Zeng, Beijing (CN)

(73) Assignees: Beijing Zhongxiangying Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/765,595

(22) PCT Filed: Apr. 30, 2021

(86) PCT No.: PCT/CN2021/091643
§ 371 (c)(1),
(2) Date: Mar. 31, 2022

(87) PCT Pub. No.: WO2022/227049
PCT Pub. Date: Nov. 3, 2022

(65) Prior Publication Data
US 2024/0094141 A1 Mar. 21, 2024

(51) Int. Cl.
*G01N 21/95* (2006.01)

(52) U.S. Cl.
CPC ...... *G01N 21/95* (2013.01); *G01N 2021/9511* (2013.01)

(58) Field of Classification Search
CPC ............. G01N 21/95; G01N 2021/9511
See application file for complete search history.

(56) References Cited

U.S. PATENT DOCUMENTS

| 11,221,300 B2 * | 1/2022 | Li .................. G01B 21/02 |
| 2013/0258330 A1 | 10/2013 | Maekawa et al. |

(Continued)

FOREIGN PATENT DOCUMENTS

| CN | 102901734 A | 1/2013 |
| CN | 103229046 A | 7/2013 |

(Continued)

OTHER PUBLICATIONS

PCT/CN2021/091643 international search report.
(Continued)

*Primary Examiner* — Hung V Nguyen
(74) *Attorney, Agent, or Firm* — IPro, PLLC

(57) ABSTRACT

The present disclosure provides a method for processing defect information of a product, which includes the following steps of: acquiring defect information on a current film layer and defect information on historical film layers; determining whether defect information exists at a target location of the historical film layer if defect information exists at a target location of the current film layer; if defect information exists for a corresponding location to the target location in at least one of the historical film layers, deleting the defect information detected at the target location in the current film layer; and if no defect information exists for the target location in any of the historical film layers, retaining the defect information detected at the target location in the current film layer. According to this, for the defect information on the current film layer, only the defect information caused by factors of the current film layer may be retained, and the defect information caused by the historical film layers will not be retained, and thus, on the one hand, the stored data volume may be reduced, and on the other hand, the complexity of subsequent analysis of defect information may be simplified.

17 Claims, 9 Drawing Sheets

(56) References Cited

U.S. PATENT DOCUMENTS

| | | | |
|---|---|---|---|
| 2014/0285796 A1* | 9/2014 | Yager | G01N 21/8422 |
| | | | 356/237.1 |
| 2015/0039118 A1 | 2/2015 | Samantaray et al. | |
| 2023/0123595 A1* | 4/2023 | Seok | G01N 21/95 |
| | | | 356/239.1 |

FOREIGN PATENT DOCUMENTS

| | | | |
|---|---|---|---|
| CN | 104713886 A | | 6/2015 |
| CN | 106501978 A | | 3/2017 |
| CN | 111999308 A | | 11/2020 |
| JP | 2001305073 A | | 10/2001 |
| JP | 2008164336 A | * | 7/2008 |

OTHER PUBLICATIONS

Jianshu Zhang. "The Design and Implementation of Yield Management System Based on Statistical Process Control." A thesis for a master's degree. University of Inner Mongolia. Jun. 2018.

Wenfu Zhang, et al. "Design of AOI Defect Map Monitoring based on YMS." Technology Innovation and Application. pp. 104-108. 2019 (19).

* cited by examiner

METHODS AND DEVICES FOR PROCESSING AND RETRIEVING DEFECT INFORMATION OF PRODUCT

CROSS-REFERENCE TO RELATED APPLICATIONS

The present application is a U.S. National Phase of International Application No. PCT/CN2021/091643, entitled "METHODS AND DEVICES FOR PROCESSING AND RETRIEVING DEFECT INFORMATION OF PRODUCT", and filed on Apr. 30, 2021. The entire contents of each of the above-listed applications are hereby incorporated by reference for all purposes.

TECHNICAL FIELD

The present disclosure relates to the field of display technologies, and in particular to methods for processing defect information of a product, methods for retrieving defect information of a product, devices for processing defect information of a product, devices for retrieving defect information of a product, an electronic device and a computer-readable storage medium.

BACKGROUND

In the process of manufacturing a display panel, a plurality of film layers are to be formed, for example, when the products of organic light-emitting diodes (OLED) or liquid crystal displays are manufactured, in the early film forming stage, 15-20 courses of film forming processes will be performed, and each formed film layer needs to be detected to determine defect information therein.

SUMMARY

In view of this, embodiments of the present disclosure provide methods for processing defect information of a product, methods for retrieving defect information of a product, devices for processing defect information of a product, devices for retrieving defect information of a product, an electronic device and a computer-readable storage medium, so as to solve technical problems in related arts.

According to a first aspect of embodiments of the present disclosure, a method for processing defect information of a product is provided, where the product includes a plurality of film layers. The method includes the following steps of: acquiring defect information on a current film layer and defect information on historical film layers, where the historical film layers were formed before formation of the current film layer; determining a target location in the current film layer for the defect information, and determining whether defect information exists for a corresponding location to the target location in any of the historical film layers; if defect information exists for the target location in at least one of the historical film layers, deleting the defect information detected at the target location in the current film layer; and if defect information exists for the target location in at least one of the historical film layers, retaining the defect information detected at the target location in the current film layer.

According to a second aspect of embodiments of the present disclosure, a method for retrieving defect information of a product is provided, where the product includes a plurality of film layers. The method includes the following steps of: receiving a query instruction sent by a client; retrieving defect information for the plurality of film layers according to the query instruction; and generating front-end data according to a query result, where the defect information for the plurality of film layers is determined by: acquiring defect information on a current film layer and defect information on historical film layers, where the historical film layers were formed before formation of the current film layer; determining a target location in the current film layer for the defect information, and determining whether defect information exists for a corresponding location to the target location in any of the historical film layers; if defect information exists for the target location in at least one of the historical film layers, deleting the defect information detected at the target location in the current film layer; and if defect information exists for the target location in at least one of the historical film layers, retaining the defect information detected at the target location in the current film layer. Defect information stored in a data table includes recorded defect information.

According to a third aspect of embodiments of the present disclosure, a device for processing defect information of a product is provided, where the product includes a plurality of film layers. The device includes: a defect information acquiring module configured to acquire defect information on a current film layer and defect information on historical film layers, where the historical film layers were formed before formation of the current film layer; a defect determining module configured to determine a target location in the current film layer for the defect information, and determine whether defect information exists for a corresponding location to the target location in any of the historical film layers; an information deleting module configured to delete the defect information detected at the target location in the current film layer if defect information exists for the target location in at least one of the historical film layers; and an information recording module configured to retain the defect information detected at the target location in the current film layer if defect information exists for the target location in at least one of the historical film layers.

According to a fourth aspect of embodiments of the present disclosure, a system for retrieving defect information of a product is provided, where the product includes a plurality of film layers. The system includes a data processing device, a display device and a distributed storage device.

The distributed storage device is configured to store defect information detected in a current film layer and defect information detected in historical film layers, where the historical film layers were formed before formation of the current film layer.

the data processing device is configured to acquire the defect information detected in the current film layer from the distributed storage device, determine a target location in the current film layer for the defect information, determine whether defect information exists for a corresponding location to the target location in any of the historical film layers, delete the defect information detected at the target location in the current film layer if defect information exists for the target location in at least one of the historical film layers, retain the defect information detected at the target location in the current film layer if defect information exists for the target location in at least one of the historical film layers, and store the retained defect information in the distributed storage device.

The display device is configured to retrieve defect information in the distributed storage device according to a received query instruction, and generate front-end data.

According to a fifth aspect of embodiments of the present disclosure, a device for retrieving defect information of a product is provided, where the product includes a plurality of film layers. The device includes: an instruction receiving module configured to receive a query instruction sent by a client; an information querying module configured to retrieve defect information for the plurality of film layers according to the query instruction; and a front-end generating module configured to generate front-end data according to a query result; where the defect information for the plurality of film layers is determined by: acquiring defect information on a current film layer and defect information on historical film layers, where the historical film layers were formed before formation of the current film layer; determining a target location in the current film layer for the defect information, determining whether defect information exists for a corresponding location to the target location in any of the historical film layers; if defect information exists for the target location in at least one of the historical film layers, deleting the defect information detected at the target location in the current film layer; and if defect information exists for the target location in at least one of the historical film layers, retaining the defect information detected at the target location in the current film layer, where defect information in a data table includes recorded defect information.

According to a sixth aspect of embodiments of the present disclosure, a detection device is provided. The device includes: a processor, and a memory configured to store instructions executable by the processor, where the processor is configured to implement the above-mentioned method for processing defect information of a product.

According to a seventh aspect of embodiments of the present disclosure, an electronic device is provided. The electronic device includes: a processor, and a memory configured to store instructions executable by the processor, where the processor is configured to implement the above-mentioned method for retrieving defect information of a product.

According to an eighth aspect of embodiments of the present disclosure, a computer-readable storage medium in which computer programs are stored is provided, wherein the programs are executed by a processor to implement the steps in the above-mentioned method for processing defect information of a product.

According to a ninth aspect of embodiments of the present disclosure, a computer-readable storage medium in which computer programs are stored is provided, wherein the programs are executed by a processor to implement the steps in the above-mentioned method for retrieving defect information of a product.

According to the embodiments of the present disclosure, when defect information is detected at a target location in a current film layer, the detected defect information is not recorded directly, but it can be determined that whether defect information also exists at target locations in previously formed historical film layers. If defect information also exists, it indicates that the defect information existing for the target location in the current film layer is caused by the defect information existing for the target locations in the historical film layers, thus, the defect information for the target location in the current film layer may be deleted; and if no defect information exists, it indicates that the defect information existing for the target location in the current film layer is not caused by the defect information existing for the target locations in the historical film layers, but caused by factors of the current film layer, thus, the defect information for the target location in the current film layer may be recorded.

Based on this, for the defect information on the current film layer, only the defect information caused by the factors of the current film layer may be retained, and the defect information caused by the historical film layers will not be retained. Therefore, on the one hand, the stored data size may be reduced, and on the other hand, the complexity of subsequent analysis of defect information may be simplified.

BRIEF DESCRIPTION OF THE DRAWINGS

To describe the technical solutions in the embodiments of the present disclosure more clearly, the following briefly introduces the accompanying drawings required for describing the embodiments, apparently, the accompanying drawings in the following descriptions show merely some embodiments of the present disclosure, and those of ordinary skill in the art may still derive other drawings from the accompanying drawings without creative efforts.

DETAILED DESCRIPTION OF THE EMBODIMENTS

The following clearly and completely describes the technical solutions in the embodiments of the present disclosure with reference to the accompanying drawings in the embodiments of the present disclosure, and apparently, the described embodiments are only some of the embodiments of the present disclosure rather than all embodiments. All other embodiments obtained by those of ordinary skill in the art based on the embodiments of the present disclosure without creative efforts shall fall within the protection scope of the present disclosure.

Figure 1:
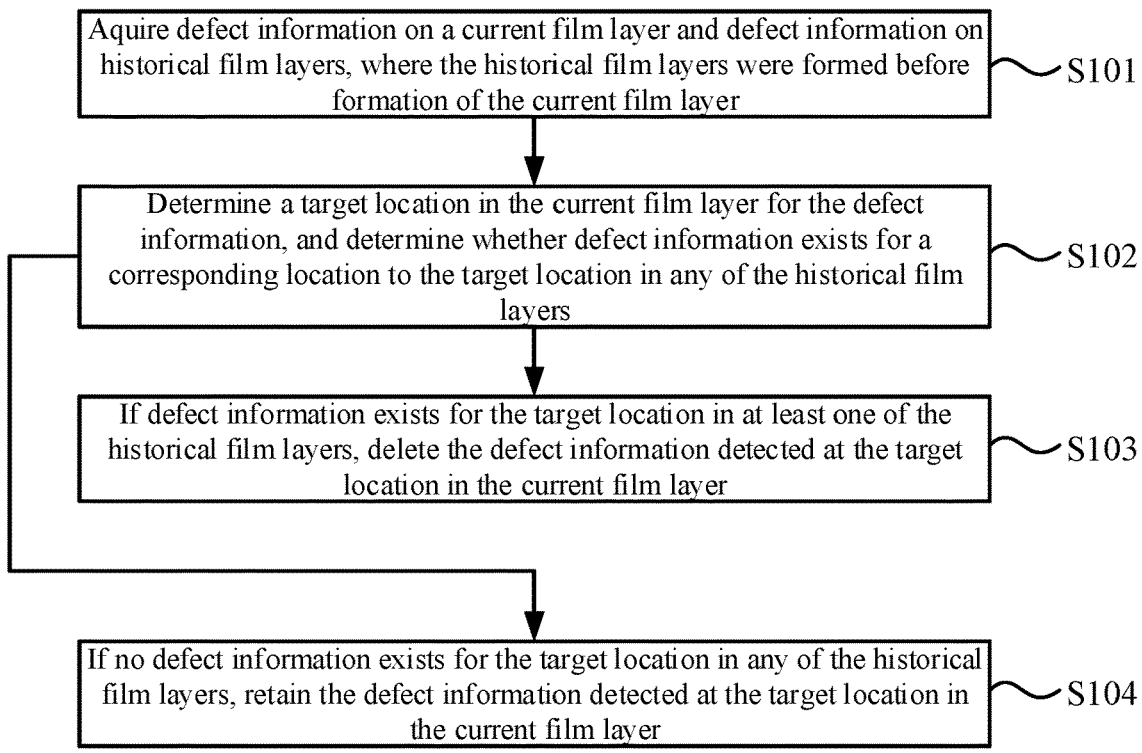
FIG. 1 shows a flowchart illustrating a method for processing defect information of a product according to an embodiment of the present disclosure.

FIG. 1 shows a flow chart illustrating a method for processing defect information of a product according to an embodiment of the present disclosure. The method shown in this embodiment may be applied in the process of detecting membrane film layer of a display panel, for example, the method may be applied in an early film formation stage of a manufacturing process of the display panel, i.e., in the process of detecting each formed film layer, and also may be applied in the stage of formation of other film layers, i.e., in the process of detecting other film layers. The display panel includes but not limited to organic light-emitting diode display panel, liquid crystal display panel, etc.

As shown in FIG. 1, the method for processing defect information of a product may include the following steps.

In step S101, defect information on a current film layer and defect information on historical film layers are acquired, where the historical film layers were formed before formation of the current film layer.

In step S102, a target location in the current film layer for the defect information is determined, and whether defect information exists for a corresponding location to the target location in any of the historical film layers is determined.

In step S103, if defect information exists for the target location in at least one of the historical film layers, the defect information detected at the target location in the current film layer is deleted.

In step S104, if no defect information exists for the target location in any of the historical film layers, the defect information detected at the target location in the current film layer is retained.

In the processes of manufacturing an organic light-emitting diode (OLED) display panel and a liquid crystal display (LCD) panel, a plurality of film layers are to be formed, for example, in the process of manufacturing an array substrate therein, a process for forming each film layer includes but not limited to thin film deposition, photo, developing, etching and stripping.

In the process of formation of a plurality of film layers, a film layer formed later will cover a film layer formed previously, which may result in forming defects in the film layer formed previously and further generating defects in the film layer formed later. For example, if a depression occurs at a certain location in a film layer formed previously, a certain depression may also exist at the location in a film layer formed later. If the defect information in each film layer is recorded repeatedly according to this situation, the complexity of subsequent analysis on the defect information will be increased.

In one embodiment, methods of detecting a film layer can be selected as required, for example, the film layer can be detected by means of automated optical inspection (AOI).

In one embodiment, a current film layer may be a most recently formed film layer. Each film layer formed after a first film layer (such as a bottom film layer) is formed may be taken as a current film layer to perform the above-mentioned steps.

In one embodiment, defect information detected in a film layer includes but is not limited to various types of defects such as bulges, depressions, fractures, and losses and the like.

In one embodiment, when defect information is detected, a location (such as a coordinate) of the defect information may be recorded.

In one embodiment, in a process of manufacturing a display panel, if a glass substrate is to be cut to obtain a plurality of display panels and detection on defect information is performed before cutting, a location for the defect information in the glass substrate may be recorded first, and then after cutting, a display panel at which the defect information is located and the coordinate of the defect information in the display panel are determined based on the cutting method. Display panels in all embodiments of the present disclosure may be display panels obtained after cutting.

According to an embodiment of the present disclosure, when defect information is detected at a target location in a current film layer, the detected defect information is not recorded directly, but it can be determined that whether defect information also exists at corresponding locations (e.g., the target locations or locations within a certain range of the target locations) in historical film layers which were previously formed.

If defect information also exists, it indicates that the defect information existing for the target location in the current film layer is caused by the defect information existing for the target locations in the historical film layers, therefore, the defect information existing for the target location in the current film layer may be deleted; and if no defect information exists, it indicates that the defect information existing for the target location in the current film layer is not caused by the defect information existing for the target locations in the historical film layers, but caused by factors of the current film layer (the implementation environment of the current film layer, a process of forming the current film layer, etc.), therefore, the defect information existing for the target location in the current film layer may be retained.

According to this, for the defect information on the current film layer, only the defect information caused by the factors of the current film layer may be retained, and the defect information caused by the historical film layers will not be retained. Therefore, on the one hand, the stored data size may be reduced, and on the other hand, the complexity of subsequent analysis of defect information may be simplified.

Figure 2:
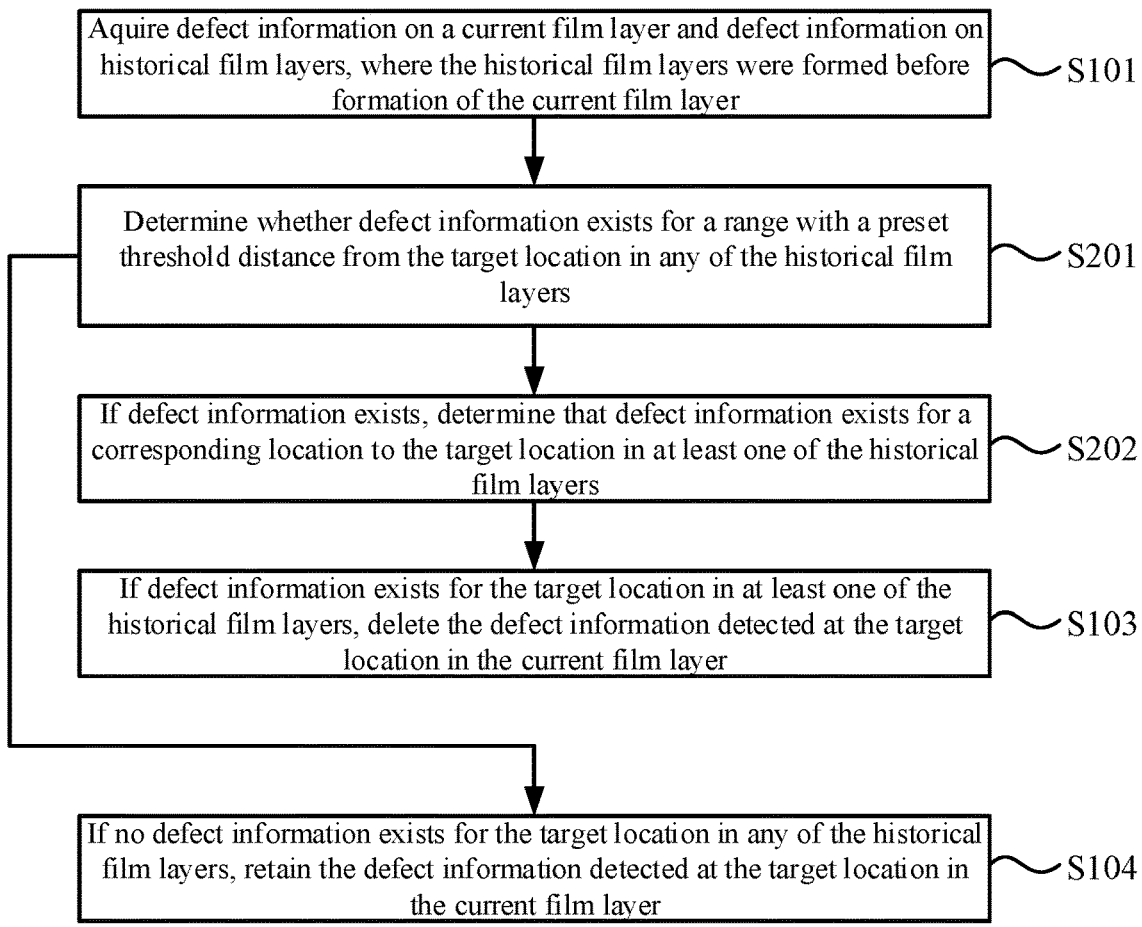
FIG. 2 shows a flowchart illustrating another method for processing defect information of a product according to an embodiment of the present disclosure.

FIG. 2 shows a flowchart illustrating another method for processing defect information of a product according to an embodiment of the present disclosure. As shown in FIG. 2, the step of determining whether defect information exists for a corresponding location to the target location in any of the historical film layers includes the following steps:

In step S201, whether defect information exists for a range with a preset threshold distance from the target location in any of the historical film layers is determined.

In step S202, if defect information exists, that defect information exists for a corresponding location to the target location in at least one of the historical film layers is determined.

In one embodiment, if defect information on historical film layers results in occurrence of defect information on the current film layer, due to factors such as production process, and film layer structure and the like, the location for the defect information on the historical film layer may be slightly different from the location for the defect information on the current film layer.

Thus, at the time of determining whether defect information exists at the corresponding location to the target location in the historical film layer, whether defect information exists for a range with a preset threshold distance from the target location in any of the historical film layers may be determined. For example, a distance from a coordinate of the defect information on the historical film layer to a coordinate of the target location in the historical film layer may be calculated. If the distance is less than the threshold distance, it can be determined that defect information exists for the target location in the historical film layer; and if the distance is greater than the threshold distance, it can be determined that no defect information exists for the target location in the historical film layer.

If the distance is equal to the threshold distance, the circumstance may be classified as a circumstance that the distance is less than the threshold distance or greater than the threshold distance as required.

In one embodiment, if a linear defect such as a defect in a row direction, a defect in a column direction, or a defect in a diagonal direction, and the like exists in the current film layer, a corresponding straight line of the linear defect may be determined in a historical film layer, then whether defect information with a distance to the straight line less than the preset threshold distance exists is determined in the defect information of the historical film layer. If defect information exists, it is determined that defect information exists for a corresponding location to the target location in at least one of the historical film layers.

In one embodiment, the step of determining whether defect information exists for a range with a preset threshold distance from the target location in any of the historical film layers includes:
  if a defect in a row direction exists in a current film layer, determining whether defect information exists in the range of a preset threshold distance in the column direction from the target location in the historical film layer; and
  if defect information exists, determining that defect information exists for a corresponding location to the target location in at least one of the historical film layers.

In one embodiment, the step of determining the distance between a defect location of the defect information existing in the historical film layer and the target location includes:
  if a defect in a column direction exists in the current film layer, determining whether defect information exists for a range with the preset threshold distance in a row direction from the target location in any of the historical film layers; and
  if defect information exists, determining that defect information exists for a corresponding location to the target location in at least one of the historical film layers.

Since a structure in a display panel will affect an entire row of pixels, or an entire column of pixels generally, for example, the problems existing in a line may affect an entire row of pixels, and the problems existing in a data line may affect an entire column of pixels. Therefore, defect information in film layers may be a defect in a row direction, for example, the entire row of pixels cannot be turned on or are out of control in emitting light, and also may be a defect in a column direction, for example, the entire column of pixels cannot be turned on or are out of control in emitting light.

With regard to the defect in row direction, defect information extends to the entire panel in row direction, and thus is equivalent to a straight line along the row direction. So, to determine a distance from a point to the straight line, it only needs to consider a distance from the point to a vertical line direction of the straight line, and for a straight line along the row direction, it only needs to consider a distance from a location for the defect information on the historical film layer to the straight line in the column direction, i.e., whether defect information exists in the range of the preset threshold distance in the column direction to the target location in the historical film layer is calculated. If defect information exists, it is determined that defect information exists for the target location of the historical film layer, where the target location referred here may be not a point, but a row.

Correspondingly, with regard to a defect in a column direction, defect information extends to the entire panel in the column direction, and thus is equivalent to a straight line along the column direction. So, to determine a distance from a point to a straight line, it only needs to consider a distance from the point to a vertical line direction of the straight line, and for a straight line along the column direction, and it only needs to consider a distance from a location for the defect information on the historical film layer in row direction to the straight line, i.e., whether defect information exists in the range of a preset threshold distance in row direction to the target location in the historical film layer is calculated. If defect information exists, it may be determined that defect information exists for the target location of the historical film layer, where the target location referred here may be not a point, but a column.

For example, if the row direction refers to a X direction, and the column direction refers to a Y direction, the pseudo-codes for the steps mentioned above may be as follows:
  INPUT: STEP_LIST: a list of defect points arranged in an order of stations; and TOL stands for a tolerate within which points are considered as the same point

```
forwardSteps:[ ]
currentStep: steps [0]
result:[ ]
FOR index IN 0 to LEN(STEP_LIST):
    currentStep = steps[index]
    layerResult = [ ]
    FOR point in currentStep:
        isValide = 0
        FOR step in result:
            FOR fPoint in step:
                IF(DISTANCE(point, fPoint) < TOL):
                    isValide += 1
        IF isValide == 0:
            layerResult <- point
    result <- layerResult
RETURN result
FUNCTION DISTANCE(point1, point2):
SWITCH (point.defectType):
    CASE "POINT": RETURN MATH.HYPOT(point1.X -
point2.X, point1.Y - point2.Y)
        CASE "XLINE": RETURN ABS(point1.Y - point2.Y)
    CASE "YLINE": RETURN ABS(point1.X- point2.X)
```

Where a DISTANCE function refers to that, for a defect in a row direction, it only needs to consider a distance from a location of defect information in a historical film layer in the column direction to a straight line in row direction; and for a defect in a column direction, it only needs to consider a distance from a location of defect information in a historical film layer in row direction to a straight line in the column direction.

For example, input data of STEP_LIST in the codes above is in json format, and the input data, for example, includes but is not limited to the following contents:

```
[
    {
        "station":"ST01",
        "point": [
            {
                "x": 98.1,
                "y": 60.5,
                "code": "A01"
            },
            {
                "x": 198.1,
                "y": 160.5,
                "code": "A01"
            },
            {
                "x": 298.1,
                "y": 260.5,
                "code": "A02"
            }
        ]
    },
    {
        "station":"ST02",
        "point": [
            {
                "x": 98.01,
                "y": 60.51,
                "code": "A01"
            },
            {
                "x": 180.1,
                "y": 160.5,
                "code": "A01"
            },
            {
                "x": 218.1,
                "y": 260.5,
                "code": "A02"
            }
        ]
    }
]
``` where x refers to a row direction coordinate, y refers to a column direction coordinate, and code refers to a type of defect information.

In one embodiment, before defect information on a current film layer and defect information on historical film layers are acquired, the method further includes: determining a defect location of the defect information on the current film layer, and information on cutting of a display panel at which the defect location is located; according to historical information on cutting, determining an association relationship between a coordinate in the display panel and a coordinate in a glass substrate at which the display panel is located before cutting; and according to the association relationship, determining a location of the defect location in the glass substrate.

In the process of manufacturing a display panel, it is generally required to cut a relatively large glass substrate to obtain multiple relatively small display panels, and the above-mentioned film layers may include film layers formed before and after cutting.

However, an operation of detecting defect information in a film layer is generally performed after the current film layer is made and before a next film layer is made. Thus, with regard to a film layer formed on the glass substrate before cutting, the location of defect information recorded during detection is a coordinate in a glass substrate coordinate system, and with regard to a film layer formed in a display panel after cutting, the location of defect information recorded during detection is a coordinate in a display panel coordinate system. In this case, this will result in that the locations of defect information in different film layers may be located in different coordinate systems, which is undesirable for subsequent processing.

In this embodiment, before defect information on the current film layer and defect information on the historical film layers are acquired, a defect location of the defect information on the current film layer and information on cutting of a display panel at which the defect location is located may be determined firstly.

The information on cutting, for example, may be a serial number of the display panel in the glass substrate before cutting, a cutting method of the glass substrate, a spatial corresponding relationship between the serial number and the cutting method, etc.

An association relationship between a coordinate in the display panel and a coordinate in a glass substrate at which the display panel is located before cutting may be determined based on the information on cutting, and the association relationship may represent a relationship between the glass substrate coordinate system and the display panel coordinate system, and includes but is not limited to relationships such as rotation, translation, etc.

Then, the location of the defect location in the glass substrate is determined according to the association relationship. For example, the association relationship is a transformation matrix from the display panel coordinate system to the glass substrate coordinate system, so, location information of the defect information detected in the display panel may be transformed through the transformation matrix, so as to obtain the location for the defect information in the display panel in the glass substrate.

As a result, the location information of defect information in all display panels may be transformed to be under the glass substrate coordinate system to facilitate subsequent processing such as operations of determining a target location of defect information on the current film layer, determining whether defect information exists for a corresponding location to the target location in any of the historical film layers, and aggregating defect information, and the like.

Figure 3:
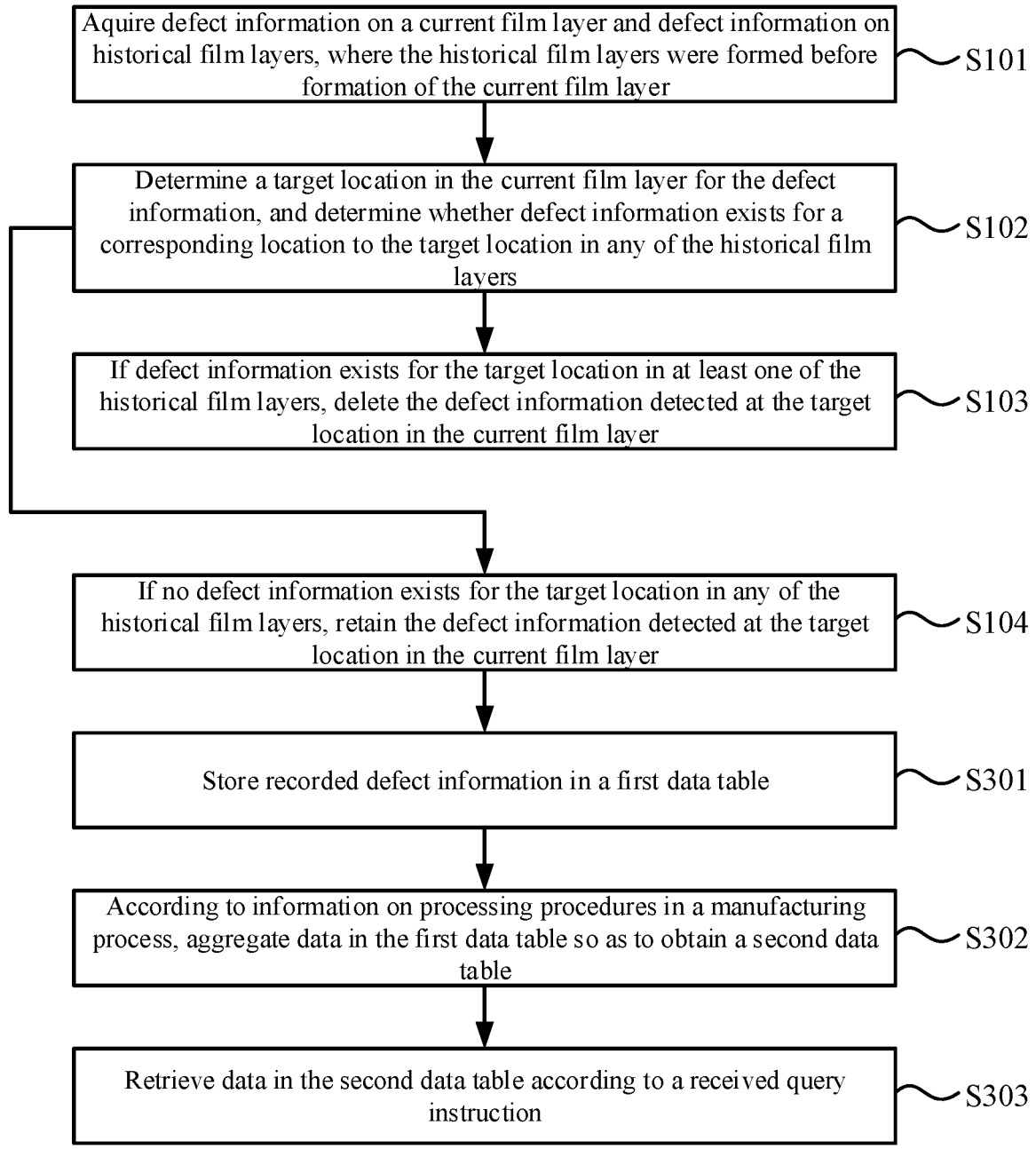
FIG. 3 shows a flowchart illustrating another method for processing defect information of a product according to an embodiment of the present disclosure.

FIG. 3 shows a flowchart illustrating another method for processing defect information of a product according to an embodiment of the present disclosure. As shown in FIG. 3, the method further includes the following steps.

In step S301, recorded defect information is stored in a first data table.

In step S302, according to information on processing procedures in a manufacturing process, data in the first data table is aggregated so as to obtain a second data table.

In step S303, data is retrieved (also known as scanned) in the second data table according to a received query instruction.

Since in the process of manufacturing a display panel, a plurality of film layers are to be manufactured, and more defect information may be detected on each film layer. In a case that a plurality of factories manufacture a large number of display panels, if all display panels manufactured in the plurality of factories are detected, a very huge quantity of defect information will be detected.

According to this embodiment, the recorded defect information may be stored in the first data table firstly, and then according to the information on processing procedures in the manufacturing process, data in the first data table is aggregated so as to obtain the second data table, where the information on processing procedures includes but is not limited to:

factory (factories that manufacture film layers), date (dates of manufacturing the film layers), detection station (stations that detect the film layers), equipment (equipment to which the film layers are subordinate), product (products to which the film layers belong), defect type (type of defect information in film layers).

The operation of aggregating data in the first data table according to the information on processing procedures in the manufacturing process may refer to an operation of aggregating a plurality of pieces of defect information having same information on processing procedures into one piece of data.

The information on processing procedures including date, detection station and defect type is taken as an example. For example, for the following nine pieces of defect information:

defect information 1: date 2021 Apr. 25, detection station station1, type codeA1, coordinate (x1,y1);
defect information 2: date 2021 Apr. 25, detection station station1, type codeA1, coordinate (x2,y2);
defect information 3: date 2021 Apr. 25, detection station station1, type codeA1, coordinate (x3,y3);
defect information 4: date 2021 Apr. 25, detection station station1, type codeA1, coordinate (x4,y4);
defect information 5: date 2021 Apr. 25, detection station station1, type codeA2, coordinate (x5,y5);
defect information 6: date 2021 Apr. 25, detection station station1, type codeA2, coordinate (x6,y6);
defect information 7: date 2021 Apr. 25, detection station station1, type codeA2, coordinate (x7,y7);
defect information 8: date 2021 Apr. 25, detection station station1, type codeA2, coordinate (x8,y8);
defect information 9: date 2021 Apr. 25, detection station station1, type codeA2, coordinate (x9,y9);
the defect information 1 to the defect information 4 are same in data, detection station and type, thus, the four pieces of defect information may be aggregated into one piece of data; and the defect information 5 to the defect information 9 are same in data, detection station and type, thus, the five pieces of defect information may be aggregated into one piece of data. In this way, the above-mentioned nine pieces of data may be aggregated into two pieces of data, for example, the two pieces of aggregated data are shown as follows:
date 2021 Apr. 25, detection station station1, type codeA1, coordinates (x1,y1), (x2,y2), (x3,y3), (x4,y4); and date 2021 Apr. 25, detection station station1, type codeA2, coordinates (x5,y5), (x6,y6), (x7,y7), (x8,y8), (x9,y9).

Thus, a plurality of pieces of defect information having the same information on processing procedures may be aggregated into one piece of data, instead of used as a plurality of pieces of data, thereby facilitating the improvement of follow-up quick retrieving.

In one embodiment, the first data table and/or the second data table are data tables in a Hbase database.

Since the Hbase database are characterized by mass storage, column-based storage, ease for expansion, high concurrency, and sparseness and the like, the Hbase database is convenient for storing a large amount of defect information, and rowkeys of the Hbase may be designed based on the information on processing procedures for data aggregation, so that aggregated data may be stored in the Hbase database more reasonably.

In one embodiment, the rowkeys of the first data table are identifiers of display panels; and/or the rowkeys of the second data table include at least one of: factory, date, detection station, equipment, product, and defect type.

For example, the first table may be as shown in Table 1, and the second table may be as shown in Table 2:

TABLE 1

| Element | Data Description | Remark |
| --- | --- | --- |
| ROWKEY | PanelID | take an identifier ID of a display panel Panel as a RowKey to facilitate data loading and storage |
| INFO: panelId | PanelID | store the PanelID of a current panel |
| INFO: productId | productID | store the ID of a product to which the current panel belongs |
| INFO: glassId | glassID | store the ID of the current panel in the Glass stage of a glass substrate before cutting |
| INFO: halfGlassId | Half glass ID | the ID of the current panel in the half glass stage of the glass substrate |
| INFO: bpLotId | Lot ID | the LOT of the current panel |
| INFO: panelLocation | panelID | location information of the current panel on the glass substrate Glass before cutting |
| ${factory}: ${stationID} | Defect | store defect point location information of panels |

TABLE 2

| Element | Data Description | Remark |
| --- | --- | --- |
| ROWKEY | ${factory}\0${date}\0${stationId}\0${equipmentId}\0${productId}\0${dftCode} | design RowKeys as factory, date, station, equipment, product, and defect type based on a front-end query |
| INFO:total DATA:points | number of defect points details of (deleted) defect points stored on Join | support histogram query support point-MAP query |
| LOT:${lotID} | number of aggregated defects concerning LotID | support LOT histogram query |
| LOC:${loc} | number of aggregated defects concerning Panel locations | support Panel MAP query |

In the first data table, by taking the identifiers of the display panels as rowkeys, data loading and storage are facilitated. In the second data table, the RowKeys may be designed based on the information on processing procedures for data aggregation, for example, the information on processing procedures is same as the RowKey, so that aggregated data will be stored in the second data table more reasonably, and subsequent query of data in the second data table according to the RowKeys is facilitated.

For example, a plurality of pieces of information are stored in the second data table to obtain one piece of data as shown in Table 3 below:

TABLE 3

| ROWKEY | EAC2\x00 |
| --- | --- |
|  | 20191001\x00 |
|  | C33000N\x00 |
|  | BCXCT01\x00 |
|  | ABCD\x00 |
|  | AD0100 |
| INFO: total | 5 |
| LOT: A | 3 |
| LOT: B | 2 |
| LOC: A-01 | 2 |
| LOC: B-05 | 2 |
| LOC: B-11 | 1 |
| INFO: points | 98.01\|60.51\|ST01\x00 |
|  | 198.1\|160.5\|ST01\x00 |
|  | 298.1\|260.5\|ST01\x00 |
|  | 180.1\|160.5\|ST02\x00 |
|  | 218.1\|262.5\|ST02 |

Further, with regard to five pieces of data of defect information:
factory EAC2, date 20191001, station C33000N, equipment BCXCT01, product ABCD, defect type AD0100, coordinate (98.01,60.51)
factory EAC2, date 20191001, station C33000N, equipment BCXCT01, product ABCD, defect type AD0100, coordinate (198.1, 160.5)
factory EAC2, date 20191001, station C33000N, equipment BCXCT01, product ABCD, defect type AD0100, coordinate (298.1, 260.5)
factory EAC2, date 20191001, station C33000N, equipment BCXCT01, product ABCD, defect type AD0100, coordinate (180.1, 160.5)
factory EAC2, date 20191001, station C33000N, equipment BCXCT01, product ABCD, defect type AD0100, coordinate (218.1, 262.5).

The five pieces of data are same in factory, date, station, equipment, product and defect type. If the five pieces of data are stored according to the storage structure of the second data table, one piece of data in Hbase as shown in Table 3 may be obtained. In this way, a plurality of pieces of defect information are aggregated into one piece of data, thereby facilitating subsequent retrieving.

In one embodiment, the method further includes:
counting and then storing in the second data table at least one of the following items:
a ratio of a number of pieces of deleted defect information on the current film layer to a total number of pieces of defect information on the current film layer;
a ratio of a number of pieces of recorded defect information on the current film layer to a total number of pieces of defect information on the current film layer; and
a ratio of a number of pieces of recorded defect information on the current film layer to a number of pieces of defect information on all film layers.

Defect information influenced by the historical layers in the current film layer is deleted based on the embodiment shown in FIG. 1, but these pieces of deleted defect information may also be useful for some analysis. Hence, although these pieces of defect information are not to be specifically recorded, relevant information of these pieces of defect information may be counted to facilitate subsequent analysis and use.

In one embodiment, before the target location for the defect information on the current film layer is determined, the method further includes:
according to a display panel to which the detected defect information belongs, aggregating the detected defect information.

In a detection process, detection objects are all film layers in all display panels. If whether the defect information on the current film layer is influenced by the defect information on the historical film layers is determined for all display panels, it is possible to determine that the defect information on the current film layer of one display panel is influenced by the defect information on the historical film layers of another display panel. However, the determination result is meaningless since no direct effect will be generated among the film layers of different display panels.

Therefore, in this embodiment, before the target location for the defect information on the current film layer is determined, the detected defect information may be aggregated firstly according to a display panel to which the detected defect information belongs, so as to ensure that whether the defect information on the current film layer is influenced by the defect information on the historical film layers is determined for a same display panel, thereby avoiding recording unnecessary information.

In one embodiment, before the detected defect information is aggregated according to the display panel to which the detected defect information belongs, the method further includes:
reading historical defect information recorded for historical film layers; and
loading the defect information detected in the current film layer into the historical defect information.

In a process of manufacturing a display panel, a plurality of film layers are generally manufactured in a sequence, thus different film layers are manufactured at different times, and even some film layers are not made on a same day. Since the defect information detected in each film layer may be stored, defect information recorded for previously formed film layers and defect information recorded for later formed film layers will exist.

In this embodiment, when the current film layer is detected, the historical defect information recorded for the historical film layers may be read, and then the defect information detected in the current film layer may be loaded into the historical defect information, so that the loaded information contains the defect information of all the film layers in the display panel, thereby facilitating the subsequent determination of a situation that whether defect information exists for the target locations in the historical film layers for all film layers.

In one embodiment, the step of retrieving data in the second data table according to the received query instruction includes: receiving a query instruction sent by a client; searching the second data table according to the query instruction; and generating front-end data according to a query result.

In one embodiment, the step of generating front-end data according to the query result includes: displaying a trend of defect information according to the query result; and/or displaying a distribution of defect information according to the query result. By displaying the trend of defect information, a user may check a change of the defect information in a time dimension, and by displaying the distribution of defect information, a user may check the distribution of the defect information in each film layer and each panel.

In one embodiment, the method described in this present disclosure may be implemented based on a data warehouse ETL (Extract Transform Load). The ETL may be implemented based on a Yield Manager System (YMS), Hive (a data warehouse tool), Spark (a computing engine) and a Hbase database, and the specific implementation may be referred to the embodiments concerning a system for retrieving defect information of a product.

Firstly, all detected defect information may be stored in a YMS, then the defect information may be extracted from the YMS and stored in Hive, and finally, the defect information is retrieved from Hive via Spark and then written in the Hbase database. The steps, such as recording and deleting defect information and aggregating data, and the like, in the above-mentioned embodiment may be implemented via Spark.

The user may input a query instruction through a client, and the client may input the query instruction into a server module, and then the server module is configured to interact with the Hbase to retrieve data in the table 2 of the Hbase based on the query instruction, and send the obtained data to the client for displaying. The client may display a query result according to settings, for example, display a histogram or the distribution of defect information, and the like.

An interface of the client may mainly include three parts, a first area thereof is provided for a user to input a query element, such as RowKey in the second data table; a second area is provided for displaying the trend of query results, for example, a volume of data with an abscissa being time and an ordinate being data size, and the display manner may be a histogram, or other manners that may be set as required; and the other areas in the interface are provided to display the location of defect information in each film layer and the distribution of defect information in the display panel recorded in the embodiment as shown in FIG. 1.

A user may input a query element through the interface of the client and generate a query instruction and send it to the server module. The server module may retrieve data in the second data table of the Hbase based on the query instruction, and feed a query result back to the client which displays the query result through the interface of the client.

In addition, the embodiments of the present disclosure further provide a data detail download function, for example, data download may be performed based on defect information in a large batch of display panels. For example, after a user clicks on a histogram or inputs LOT ID (each LOT may correspond to a large batch of display panels) through an interface, a client sends a LOT detail query request to the Server module which generates a corresponding query task for an original data table obtained by filtering a previous layer, then generates a corresponding data detail file and returns it to the front end for download.

Figure 4:
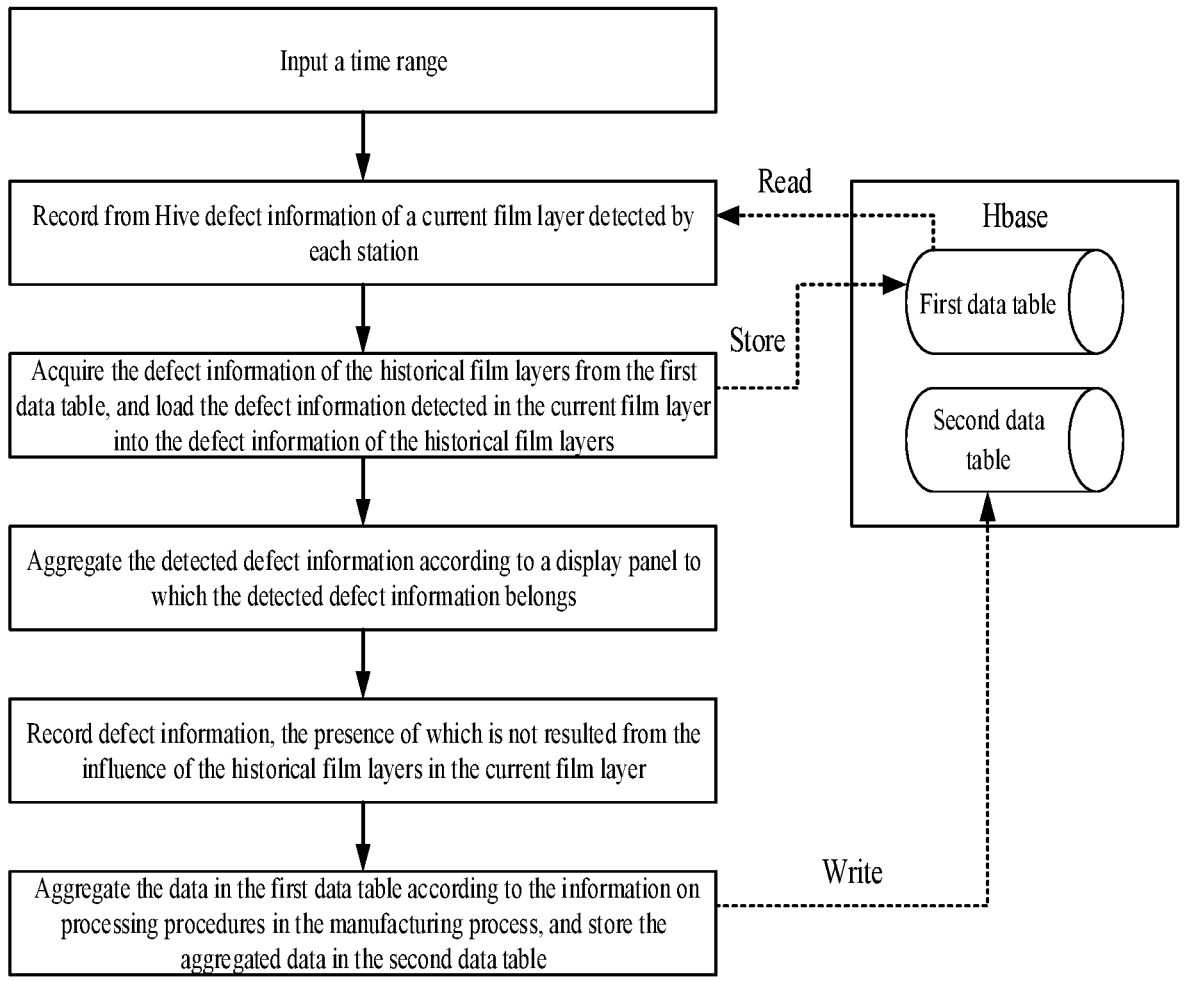
FIG. 4 shows a flowchart illustrating data aggregation according to an embodiment of the present disclosure.

FIG. 4 shows a flowchart illustrating data aggregation according to an embodiment of the present disclosure.

As shown in FIG. 4, firstly, a time range may be inputted so as to determine defect information of historical film layers within this time range.

Then, Spark may record from Hive defect information of a current film layer detected by each station, and transform a coordinate of defect information in a glass substrate to a panel obtained after cutting if the glass substrate is to be cut.

During formation of the historical film layers, defect information on the historical film layers may be recorded in the first data table. In this way, when the current film layer is formed, the defect information of the historical film layers may be acquired from the first data table, and the defect information detected in the current film layer may be loaded into the defect information of the historical film layers.

Then, the detected defect information may be aggregated according to a display panel to which the detected defect information belongs.

Based the embodiment shown in FIG. 1, defect information, the presence of which is not resulted from the influence of the historical film layers in the current film layer is recorded, and the recording result may be updated to the first data table, so that the defect information stored in the first data table includes both the defect information of the current film layer and that of the historical film layers.

Finally, the data in the first data table may be aggregated according to the information on processing procedures in the manufacturing process, and the aggregated data may be stored in the second data table, where the RowKey of the second data table may be the same as the information on processing procedures.

Figure 5A:
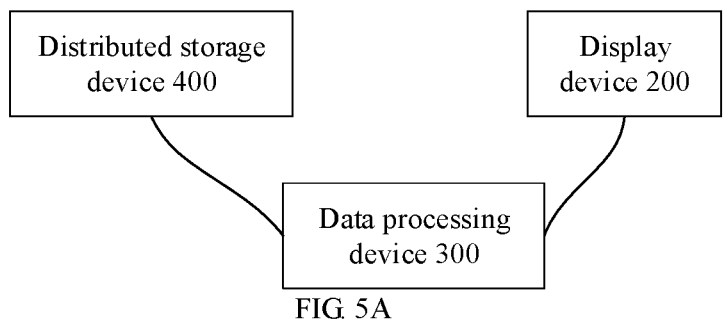
FIG. 5A shows a schematic diagram illustrating a system for retrieving defect information of a product according to an embodiment of the present disclosure.

FIG. 5 is a schematic diagram illustrating a system for retrieving defect information of a product according to an embodiment of the present disclosure. As shown in FIG. 5A, the system includes a data processing device 300, a display device 200 and a distributed storage device 400. The system may be configured to retrieve defect information of a product, the product may include a plurality of film layers, and the products include but are not limited to organic light-emitting diode display panels, liquid crystal display panels, etc.

The distributed storage device is configured to store defect information detected in a current film layer and defect information detected in historical film layers, where the historical film layers were formed before formation of the current film layer.

The data processing device is configured to acquire the defect information detected in the current film layer from the distributed storage device, determine a target location in the current film layer for the defect information, determine whether defect information exists for a corresponding location to the target location in any of the historical film layers, delete the defect information detected at the target location in the current film layer if defect information exists for the target location in at least one of the historical film layers, retain the defect information detected at the target location in the current film layer if defect information exists for the target location in at least one of the historical film layers, and store the retained defect information in the distributed storage device.

The display device is configured to retrieve defect information in the distributed storage device according to a received query instruction, and generate front-end data.

In one embodiment, the data processing device is further configured to store the recorded defect information in a first data table; and carry out aggregation on data in the first data table according to the information on processing procedures in the manufacturing process so as to obtain a second data table; and the display device is configured to retrieve defect information in the second data table according to the query instruction.

At present, a production line of industrial products includes a plurality of process devices, each of which may affect the yield of products in a case of abnormal operation or operating parameter. When a defective product is produced, production personnel need to locate a cause of defect generation. However, the number of process devices in the production line or the volume of the generated data are large, so the complexity of the cause locating is increased, thereby resulting in consumption of a large amount of time for locating an equipment causing the defects.

An embodiment of the present disclosure provides a system for retrieving defect information of a product. As shown in FIG. 5A, the system for retrieving defect information of a product includes a data processing device 300, a display device 200 and a distributed storage device 400. The data processing device 300 is respectively connected to the display device 200 and the distributed storage device 400.

The distributed storage device 400 is configured to store production data generated by a plurality of sample production equipments (or called factory equipments). For example, the production data generated by the plurality of sample production equipments includes production records of the plurality of sample production equipments; for example, the production records include information about the sample production equipments through which a plurality of samples pass during a production process and information about the occurrence of defect types. Each sample passes through a plurality of sample production equipments during the production process, and each sample production equipment participates in and only participates in the production processes of some of a plurality of samples.

The distributed storage device stores relatively complete data (e.g. a database). The distributed storage device may include a plurality of hardware memories, and different hardware memories are distributed at different physical locations (such as in different factories, or at different production lines), and implement information transfer between each other through wireless transmission (such as a network, etc.), so that data is in a distributed relationship, but logically forms a database based on big data technology.

Figure 5B:
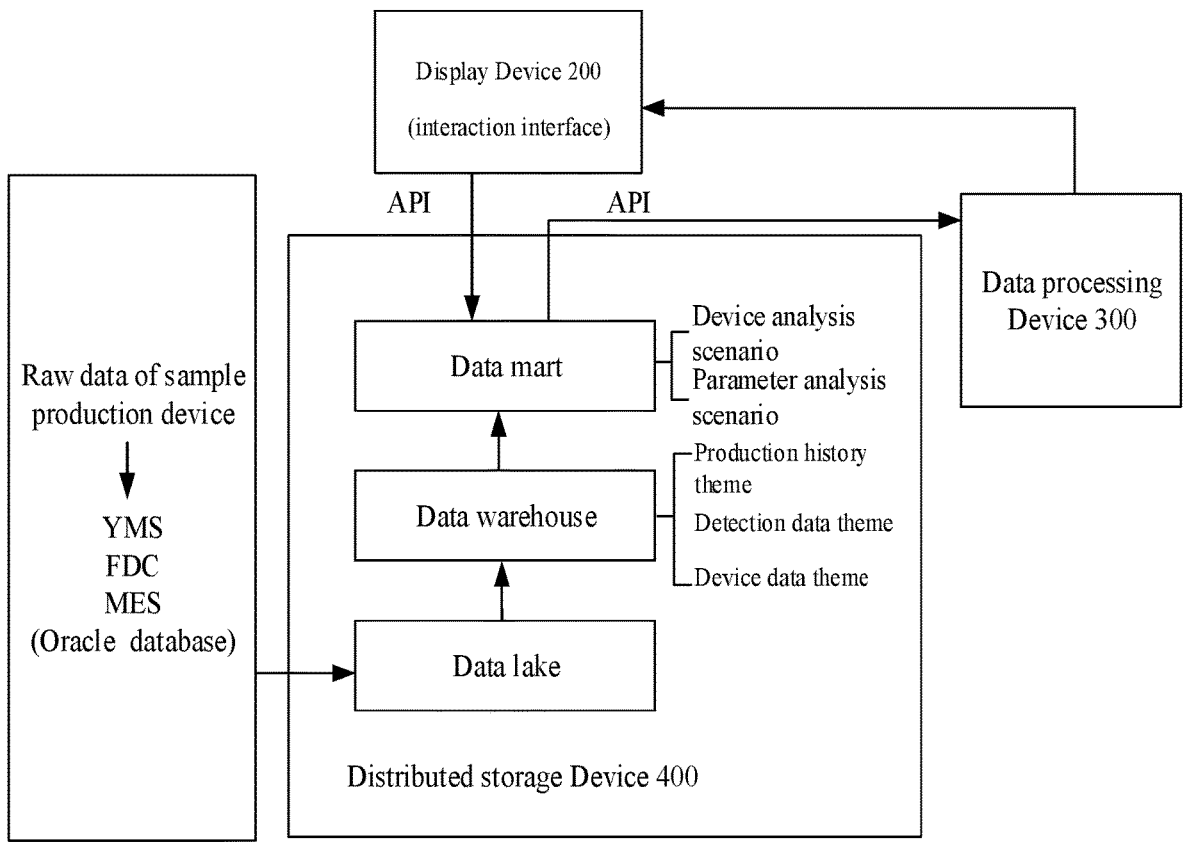
FIG. 5B shows a data flow schematic diagram illustrating a system for retrieving defect information of a product according to an embodiment of the present disclosure.

FIG. 5B shows a schematic diagram illustrating a data flow of a system for retrieving defect information of a product according to an embodiment of the present disclosure. As shown in FIG. 5B, a large amount of raw data of a plurality of different sample production equipments, such as defect information of film layers in the product, is stored in corresponding production and manufacturing systems, such as a relational database (such as Oracle, Mysql, etc.) of the systems such as a YMS (Yield Management System), an FDC (Fault Detection & Classification), an MES (Manufacturing Execution System), and the like, and these raw data may be subjected to original table extraction through a data extraction tool (such as Sqoop, kettle, etc.) to be transferred to the distributed storage device (such as a distributed file system, or a Hadoop Distributed File System (HDFS for short)), so that loads on the sample production equipments and the production and manufacturing systems are reduced, thereby facilitating subsequent data reading of analysis equipments.

Data in the distributed storage device may be stored based on Hive tool and Hbase database format. For example, according to a Hive tool, the above-mentioned raw data is stored in a data lake firstly; then, pre-processing such as data cleaning and data conversion and the like may be continued in the Hive tool according to application themes and scenarios and the like of the data so as to obtain data warehouses with different themes (such as production history themes, detection data themes, equipment data themes) and data marts with different scenarios (such as equipment analysis scenarios, and parameter analysis scenarios), such as Hbase. The above-mentioned data marts may be then connected to display devices and analysis equipments and the like through different API interfaces so as to realize data interaction with these equipments.

Since a plurality of sample production equipments in a plurality of factories are involved, the data volume of the raw data above is huge. For example, the data volume of the raw data generated per day by all sample production equipments may be hundreds of gigabytes, and the data volume of the data generated per hour also may be dozens of gigabytes.

In one embodiment, the storage and computation of mass structural data is implemented mainly according to two solutions: a grid computing solution of a RDBMS (Relational Database Management System), and a big data solution of a DFS (Distributed File System).

The DFS-based big data technology allows taking a plurality of inexpensive hardware equipments to build a large cluster to process mass data. For example, the Hive tool is a Hadoop-based data warehouse tool that may be configured to carry out data ETL (extract transform load). The Hive tool defines a simple SQL-like query language, and allows defaulting complex analysis tasks that cannot be completed by the tool through Mapper and reducer of a customized MapReduce. The Hive tool does not store data in a specific format or create indexes for data, thus, a user may organize tables therein freely to carry out processing on data in a database. It can be seen that the parallel processing of distributed file management can meet the storage and processing requirements of mass data, and the user may process simple data through SQL query, and may use custom functions to achieve complex processing. Therefore, when mass data of a factory is analyzed, data in a factory database needs to be extracted to a distributed file system, in such a way, on the one hand, that the raw data will not be destroyed, and on the other hand, the efficiency of data analysis is improved.

In one embodiment, the distributed storage device 400 may be a memory, or a plurality of memories, or a collective name of a plurality of storage elements. For example, the memory may include: RAM (Random Access Memory), DDR SRAM (Double Data Rate Synchronous Dynamic Random Access Memory), or non-volatile memory such as disk storage, Flash, etc.

The data processing device 300 is configured to implement a method for retrieving defect information of a product as described in any one of the following embodiments, for example, to implement based on Spark (a computing engine). The data processing device 300 may acquire production records (such as defect information in film layers of a product) of one or more sample production equipments from the distributed storage device 400, specifically, the data processing device 300 may acquire defect information detected in the current film layer from the distributed storage device 400 (such as from Hbase), determine a target location in the current film layer for the defect information, determine whether defect information exists for a corresponding location to the target location in any of the historical film layers, delete the defect information detected at the target location in the current film layer if defect information exists for the target location in at least one of the historical film layers, retain the defect information detected at the target location in the current film layer if no defect information exists for the target location of the historical film layers, and store the retained defect information in the distributed storage device (such as stored in Hbase).

The display device 200 is configured to display an interface of front-end data and interact with users. For example, the interface may include a first interface, a second interface, a third interface, and the like as described below. For example, the display device 200 may display processing results of the data processing device 300.

In one embodiment, the display device may be a display, or a product containing a display, such as a television, a computer (all-in-one machine or desktop computer), a computing machine, a tablet personal computer, a mobile phone, an electronic painting screen, etc. In one embodiment, the display device also may be any device that displays pictures moving (e.g., videos) and secured (e.g., motionless images) as well as texts and images. More specifically, it is expected that the embodiment may be implemented in or associated with a variety of electronic devices, the electronic devices include (but are not limited to) game consoles, television monitors, flat panel displays, computer monitors, automotive displays (e.g., Odometer displays, etc.), navigators, cockpit controllers and/or displays, electronic photographs, electronic billboards or directional signboard, projectors, architectural structures, packaging and aesthetic structures (e.g., displays for an image of a piece of jewelry), etc.

In one embodiment, the display device as described in the present disclosure may include one or more displays, and includes one or more terminals with display functions, so that the data processing device may transmit data (e.g. influence parameters) processed by itself to the display device, and then the display device displays the data. In other words, through the interface (i.e., a user interactive interface) of the display device, a user may achieve complete interaction (control and receive results) with a sample defect cause analysis system.

An embodiment of the present disclosure provides an electronic device. For example, the electronic device may be a computer, or a computing machine, etc. As shown in FIG. 3, the electronic device 500 includes a data processing device 300 and a display device 200. The display device 200 is connected to the data processing device 300.

The data processing device 300 is configured to implement a method for retrieving defect information of a product as described in any one of the following embodiments. The display device 200 is configured to display interfaces. For example, the display device 200 is configured to display processing results of the data processing device 300.

It should be stated that the data processing device and display device in the electronic device are similar to the data processing device and display device in the above method for retrieving defect information of a product, thus, the specific contents of the data processing device and display device in the electronic device may be referred to previous descriptions, and will not be described here.

In some embodiments, as shown in FIG. 5B, the data processing device 300 includes a memory 301 and a processor 302. The memory 301 and the processor 302 are connected. In one embodiment, the processor and the memory are connected through an I/O interface for example, so that information interaction may be implemented.

One or more computer programs that may be run on the processor 302 are stored in the memory 301.

The processor 302 executes the computer programs to enable the data processing device 300 to implement the method for retrieving defect information of a product as described in any one of the following embodiments.

In one embodiment, the processor 302 may be one processor or a collective name of a plurality of processing elements. As an example, the processor 302 may be a general-purpose central Processing unit (CPU), a microprocessor, an application Specific Integrated circuit (ASIC), or one or more integrated circuits (such as one or more microprocessors) configured to control the execution of programs in solutions of the present disclosure. As another example, the processor 302 may be a programmable device; and for example, the programmable device is a Complex Programmable Logic Device (CPLD)), an Erasable Programmable Logic Device (EPLD) or a field-programmable gate array (FPGA).

The memory 301 may be one memory or a collective name of a plurality of storage elements, and is configured to store executable program codes and the like. And the memory 301 may be a random access memory, and also may be a non-volatile memory such as a disk memory, and a flash memory, etc.

The memory 301 is configured to store application codes that execute the solutions of the present disclosure under the control of the processor 320. The processor 302 is configured to execute the application codes stored in the memory 301 to control the data processing device 300 to implement the method for retrieving defect information of a product as described in any one of the following embodiments.

Figure 6:
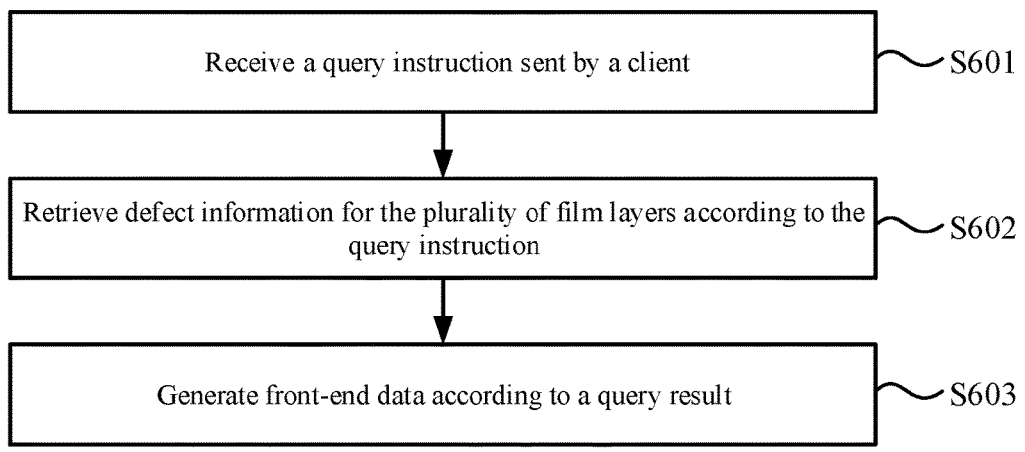
FIG. 6 shows a flowchart illustrating a method for retrieving defect information of a product according to an embodiment of the present disclosure.

FIG. 6 shows a flowchart illustrating a method for retrieving defect information of a product according to an embodiment of the present disclosure. The method shown in the embodiment may be configured to retrieve defect information in membrane film layer of a product, the product includes a plurality of film layers, the product may be a display panel, and the display panels include but are not limited to organic light-emitting diode display panels, and liquid crystal display panels, etc.

As shown in FIG. 6, the method for retrieving defect information of a product may include the following steps.

In step S601, a query instruction sent by a client is received.

In step S602, defect information for the plurality of film layers is retrieved according to the query instruction.

In step S603, front-end data is generated according to a query result.

The defect information for the plurality of film layers is determined by: acquiring defect information on a current film layer and defect information on historical film layers, where the historical film layers were formed before formation of the current film layer; determining a target location in the current film layer for the defect information, and determining whether defect information exists for a corresponding location to the target location in any of the historical film layers; if defect information exists for the target location in at least one of the historical film layers, deleting the defect information detected at the target location in the current film layer; and if defect information exists for the target location in at least one of the historical film layers, retaining the defect information detected at the target location in the current film layer, where defect information stored in a data table includes recorded defect information.

In one embodiment, the method described in this present disclosure may be implemented based on a data warehouse ETL (Extract Transform Load). The ETL may be implemented based on a YMS (Yield Manager System), Hive (a data warehouse tool), Spark (a computing engine) and a Hbase database, for example, the ETL may be implemented according to the related embodiments of the above-mentioned system for retrieving defect information of a product.

Firstly, all detected defect information may be stored in a YMS, then the defect information may be extracted from the YMS and written into Hive, and finally, the defect information is retrieved from Hive via Spark and written in the Hbase database. The operations of deleting defect information and retaining defect information may be implemented via Spark.

According to the embodiments of the present disclosure, since the defect information stored in the data table is not the defect information directly recorded when the defect information is detected at the target location in the current film layer, whether the defect information exists for the target locations in previously formed historical film layers is determined. If defect information also exists, it indicates that the defect information existing for the target location in the current film layer is caused by the defect information existing for the target locations in the historical film layers, therefore, the defect information existing for the target location in the current film layer may be deleted; and if no defect information exists, it indicates that the defect information existing for the target location in the current film layer is not caused by the defect information existing for the target locations in the historical film layers, but caused by factors (the implementation environment of the current film layer, a process of forming the current film layer, etc.) of the current film layer. Therefore, the defect information existing for the target location in the current film layer may be recorded.

Based on this, for the defect information on the current film layer, only the defect information caused by the factors of the current film layer may be retained, and the defect information caused by the historical film layers will not be retained. In this case, on the one hand, the stored data volume may be reduced, and on the other hand, the complexity of subsequent analysis of defect information may be simplified. Therefore, when a data table in which defect information is stored is retrieved according to a query instruction of a client and front-end data is generated according to a query result, the obtained data volume is relatively less, which is conducive to shortening the query delay, and the complexity of distribution of defect information is relatively low, which is convenient for users to view.

In one embodiment, if a distance between a defect location at which defect information exists in the historical film layer and the target location is less than a threshold distance, whether defect information exists at a corresponding location to the target location in the historical film layer is determined.

In one embodiment, if defect information on the historical film layer results in the occurrence of defect information on the current film layer, due to factors such as manufacturing process, and film layer structures and the like, the location for the defect information on the historical film layer may be slightly different from the location for the defect information on the current film layer.

Thus, at the time of determining whether defect information exists at a corresponding location to the target location in the historical film layer, whether defect information exists for a range with a preset threshold distance from the target location in any of the historical film layers may be determined, for example, a distance from a coordinate of the defect information on the historical film layer to a coordinate of the target location in the historical film layer may be calculated. If the distance is less than the threshold distance, it can be determined that defect information exists for the target location in the historical film layer, and if the distance is greater than the threshold distance, it can be determined that no defect information exists for the target location in the historical film layer.

In one embodiment, if a defect in a row direction exists in the current film layer, a first distance in the column direction between a defect location at which defect information exists in the historical film layer and a row of pixels corresponding to the defect in row direction is determined; and if the distance is less than a first threshold distance, it can be determined that defect information exists at a corresponding location to the target location in the historical film layer.

In one embodiment, if a defect in a column direction exists in the current film layer, a second distance in row direction between a defect location at which defect information exists in the historical film layer and a column of pixels corresponding to the defect in the column direction is determined; and if the distance is less than a second threshold distance, it can be determined that defect information exists at a corresponding location to the target location in the historical film layer.

Since a structure in a display panel will affect an entire row of pixels, or an entire column of pixels generally, for example, the problems existing in a line may affect an entire row of pixels, and the problems existing in a data line may affect an entire column of pixels. Therefore, defect information in film layers may be a defect in a row direction, for example, the entire row of pixels cannot be turned on or are out of control in emitting light, and also may be a defect in a column direction, for example, the entire column of pixels cannot be turned on or are out of control in emitting light.

With regard to the defect in row direction, defect information extends to the entire panel in row direction, and thus is equivalent to a straight line along the row direction. So, to determine a distance from a point to the straight line, it only needs to consider a distance from the point to a vertical line direction of the straight line, and for a straight line along the row direction, it only needs to consider a distance from a location for the defect information on the historical film layer to the straight line in the column direction, i.e., whether defect information exists in the range of the preset threshold distance in the column direction to the target location in the historical film layer is calculated. If defect information exists, it is determined that defect information exists for the target location of the historical film layer, where the target location referred here may be not a point, but a row.

Correspondingly, with regard to a defect in a column direction, defect information extends to the entire panel in the column direction, and thus is equivalent to a straight line along the column direction. So, to determine a distance from a point to a straight line, it only needs to consider a distance from the point to a vertical line direction of the straight line, and for a straight line along the column direction, and it only needs to consider a distance from a location for the defect information on the historical film layer in row direction to the straight line, i.e., whether defect information exists in the range of a preset threshold distance in row direction to the target location in the historical film layer is calculated. If defect information exists, it may be determined that defect information exists for the target location of the historical film layer, where the target location referred here may be not a point, but a column.

In one embodiment, before defect information on a current film layer and defect information on historical film layers are acquired, determining defect information for the plurality of film layers further includes: determining a defect location of the defect information on the current film layer, and information on cutting of a display panel at which the defect location is located; according to historical information on cutting, determining an association relationship between a coordinate in the display panel and a coordinate in a glass substrate at which the display panel is located before cutting; and according to the association relationship, determining a location of the defect location in the glass substrate.

In the process of manufacturing a display panel, it is generally required to cut a relatively large glass substrate to obtain multiple relatively small display panels, and the above-mentioned film layers may include film layers formed before and after cutting.

However, an operation of detecting defect information in a film layer is generally performed after the current film layer is made and before a next film layer is made. Thus, with regard to a film layer formed on the glass substrate before cutting, the location of defect information recorded during detection is a coordinate in a glass substrate coordinate system, and with regard to a film layer formed in a display panel after cutting, the location of defect information recorded during detection is a coordinate in a display panel coordinate system. In this case, this will result in that the locations of defect information in different film layers may be located in different coordinate systems, which is undesirable for subsequent processing.

In this embodiment, before defect information on the current film layer and defect information on the historical film layers are acquired, a defect location of the defect information on the current film layer and information on cutting of a display panel at which the defect location is located may be determined firstly.

The information on cutting, for example, may be a serial number of the display panel in the glass substrate before cutting, a cutting method of the glass substrate, a spatial corresponding relationship between the serial number and the cutting method, etc.

An association relationship between a coordinate in the display panel and a coordinate in a glass substrate at which the display panel is located before cutting may be determined based on the information on cutting, and the association relationship may represent a relationship between the glass substrate coordinate system and the display panel coordinate system, and includes but is not limited to relationships such as rotation, translation, etc.

Then, the location of the defect location in the glass substrate is determined according to the association relationship. For example, the association relationship is a transformation matrix from the display panel coordinate system to the glass substrate coordinate system, so, location information of the defect information detected in the display panel may be transformed through the transformation matrix, so as to obtain the location for the defect information in the display panel in the glass substrate.

As a result, the location information of defect information in all display panels may be transformed to be under the glass substrate coordinate system to facilitate subsequent processing such as operations of determining a target location of defect information on the current film layer, determining whether defect information exists for a corresponding location to the target location in any of the historical film layers, and aggregating defect information, and the like.

In one embodiment, before a query instruction sent by a client is received, the method further includes:
storing recorded defect information in a first data table; and
aggregating data in the first data table according to information on processing procedures in the manufacturing process so as to obtain a second data table.

Since in the process of manufacturing a display panel, a plurality of film layers are to be manufactured, and more defect information may be detected on each film layer. In a case that a plurality of factories manufacture a large number of display panels, if all display panels manufactured in the plurality of factories are detected, a very huge quantity of defect information will be detected.

According to this embodiment, the recorded defect information may be stored in the first data table firstly, and then according to the information on processing procedures in the manufacturing process, data in the first data table is aggregated so as to obtain the second data table, where the information on processing procedures includes but is not limited to:
factory (factories that manufacture film layers), date (dates of manufacturing the film layers), detection station (stations that detect the film layers), equipment (equipment to which the film layers are subordinate), product (products to which the film layers belong), defect type (type of defect information in film layers).

The operation of aggregating data in the first data table according to the information on processing procedures in the manufacturing process may refer to an operation of aggregating a plurality of pieces of defect information having same information on processing procedures into one piece of data. According to this, a plurality of pieces of defect information having the same information on processing procedures may be aggregated into one piece of data, instead of used as a plurality of pieces of data, thereby facilitating the improvement of follow-up quick retrieving.

In one embodiment, the first data table and/or the second data table are data tables in a Hbase database.

Since the Hbase database are characterized by mass storage, column-based storage, ease for expansion, high concurrency, and sparseness and the like, the Hbase database is convenient for storing a large amount of defect information, and rowkeys of the Hbase may be designed based on the information on processing procedures for data aggregation, so that aggregated data may be stored in the Hbase database more reasonably.

In one embodiment, the rowkeys of the first data table are identifiers of display panels; and/or the rowkeys of the second data table include at least one of: factory, date, detection station, equipment, product, and defect type.

In one embodiment, before a query instruction sent by a client is received, the method further includes:
counting and then storing in the second data table at least one of the following items:
a ratio of a number of pieces of deleted defect information on the current film layer to a total number of pieces of defect information on the current film layer;
a ratio of a number of pieces of recorded defect information on the current film layer to a total number of pieces of defect information on the current film layer; and
a ratio of a number of pieces of recorded defect information on the current film layer to a number of pieces of defect information on all film layers.

Although defect information influenced by the historical layers in the current film layer is deleted based on the embodiment shown in FIG. 1, these pieces of deleted defect information may also be useful for some analysis. Hence, although these pieces of defect information are not to be specifically recorded, relevant information of these pieces of defect information may be counted to facilitate subsequent analysis and use.

In one embodiment, before a target location of defect information on the current film layer is determined, the method further includes:
according to a display panel to which detected defect information belongs, aggregating the detected defect information.

In a detection process, detection objects are all film layers in all display panels. If whether the defect information on the current film layer is influenced by the defect information on the historical film layers is determined for all display panels, it is possible to determine that the defect information on the current film layer of one display panel is influenced by the defect information on the historical film layers of another display panel. However, the determination result is meaningless since no direct effect will be generated among the film layers of different display panels.

Therefore, in this embodiment, before the target location for the defect information on the current film layer is determined, the detected defect information may be aggregated firstly according to a display panel to which the detected defect information belongs, so as to ensure that whether the defect information on the current film layer is influenced by the defect information on the historical film layers is determined for a same display panel, thereby avoiding recording unnecessary information.

In one embodiment, before the detected defect information is aggregated according to the display panel to which the detected defect information belongs, the method further includes:
  reading historical defect information recorded for historical film layers; and
  loading the defect information detected in the current film layer into the historical defect information.

In a process of manufacturing a display panel, a plurality of film layers are generally manufactured in a sequence, thus different film layers are manufactured at different times, and even some film layers are not made on a same day. Since the defect information detected in each film layer may be stored, defect information recorded for previously formed film layers and defect information recorded for later formed film layers will exist.

In this embodiment, when the current film layer is detected, the historical defect information recorded for the historical film layers may be read, and then the defect information detected in the current film layer may be loaded into the historical defect information, so that the loaded information contains the defect information of all the film layers in the display panel, thereby facilitating the subsequent determination of a situation that whether defect information exists for the target locations in the historical film layers for all film layers.

In one embodiment, the step of generating front-end data according to the query result includes: displaying a trend of defect information according to the query result; and/or displaying a distribution of defect information according to the query result. By displaying the trend of defect information, a user may check a change of the defect information in a time dimension, and by displaying the distribution of defect information, a user may check the distribution of the defect information in each film layer and each panel.

Corresponding to the above-mentioned embodiments of the method for processing defect information of a product and the method for retrieving defect information of a product, the present disclosure further provides embodiments of a device for processing defect information of a product and a device for retrieving defect information of a product.

Figure 7:
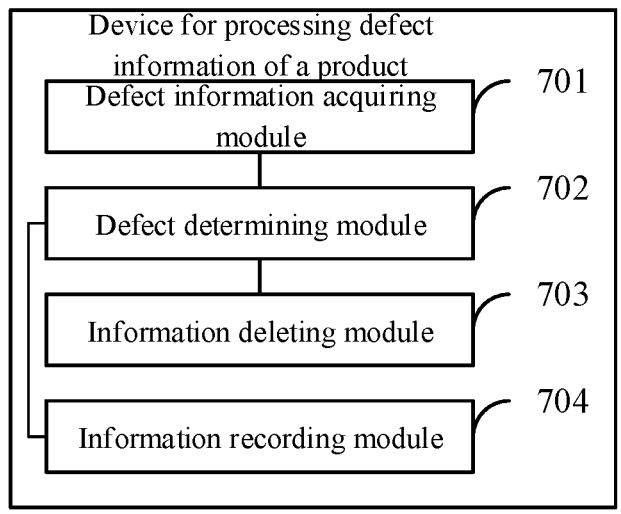
FIG. 7 shows a schematic block diagram illustrating a device for processing defect information of a product according to an embodiment of the present disclosure.

FIG. 7 shows a schematic block diagram illustrating a device for processing defect information of a product according to an embodiment of the present disclosure. The device shown in this embodiment may be applied in a process of detecting film layers of the product, the product includes a plurality of film layers, for example, the device may be applied in an early film formation stage of display panel manufacture, i.e., a process of detecting each film layer, and also may be applied in a stage of forming other film layers, i.e., in the process of detecting other film layers.

The product may be a display panel, and the display panel includes but not limited to organic light-emitting diode display panels, liquid crystal display panels, etc.

As shown in FIG. 7, the device for processing defect information of a product may include:
  a defect information acquiring module 701, configured to acquire defect information detected in a current film layer and defect information detected in historical film layers, where the historical film layers were formed before formation of the current film layer;
  a defect determining module 702, configured to determine a target location in the current film layer for the defect information, and determine whether defect information exists for a corresponding location to the target location in any of the historical film layers;
  an information deleting module 703, configured to delete the defect information detected at the target location in the current film layer if defect information exists for the target location in at least one of the historical film layers; and
  an information recording module 704, configured to retain the defect information detected at the target location in the current film layer if defect information exists for the target location in at least one of the historical film layers.

In one embodiment, the defect determining module is configured to determine whether defect information exists for a range with a preset threshold distance from the target location in any of the historical film layers; and if defect information exists, determine that defect information exists for corresponding locations to the target locations in the historical film layers.

In one embodiment, the defect determining module is configured to determine whether defect information exists in the range of a preset threshold distance in a column direction of the target location in the historical film layer if a defect in a row direction exists in the current film layer.

In one embodiment, the defect determining module is configured to determine whether defect information exists in the range of a preset threshold distance in a row direction of the target location in the historical film layer if a defect in a column direction exists in the current film layer; and if defect information exists, determine that defect information exists for the target location in at least one of the historical film layers.

In one embodiment, the device further includes:
  a cutting determining module, configured to determine a defect location of the defect information on the current film layer and information on cutting of a display panel at which the defect location is located;
  a relationship determining module, configured to determine an association relationship between a coordinate in the display panel and a coordinate in a glass substrate at which the display panel is located before cutting according to the information on cutting; and
  a location determining module, configured to determine a location of the defect location in the glass substrate according to the association relationship.

Figure 8:
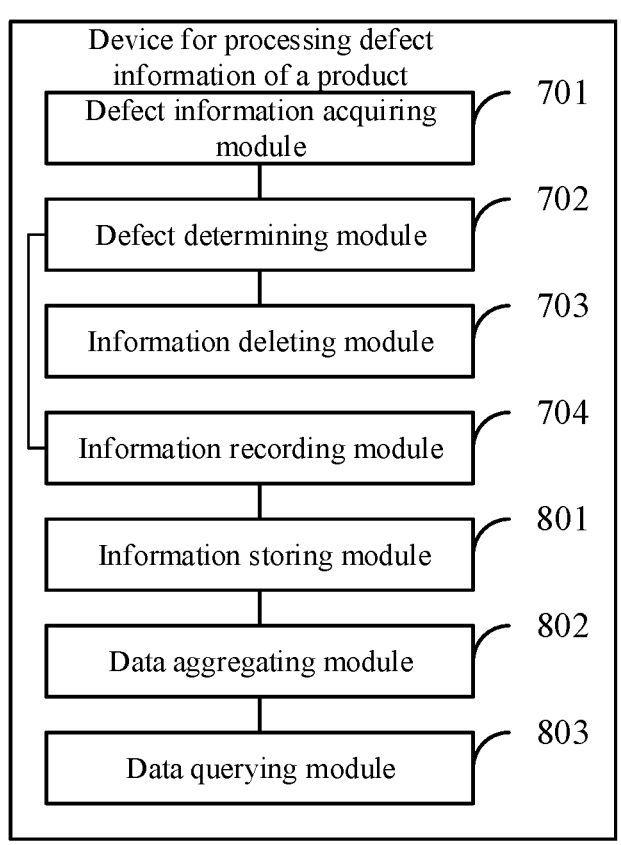
FIG. 8 shows a schematic block diagram illustrating another device for processing defect information of a product according to an embodiment of the present disclosure.

FIG. 8 shows a schematic block diagram illustrating another device for processing defect information of a product according to an embodiment of the present disclosure. As shown in FIG. 8, the device further includes:
  an information storing module 801, configured to store recorded defect information in a first data table;
  a data aggregating module 802, configured to aggregate data in the first data table according to information on processing procedures in a manufacturing process so as to obtain a second data table; and a data querying module 803, configured to retrieve data in the second data table according to a received query instruction.

Figure 9:
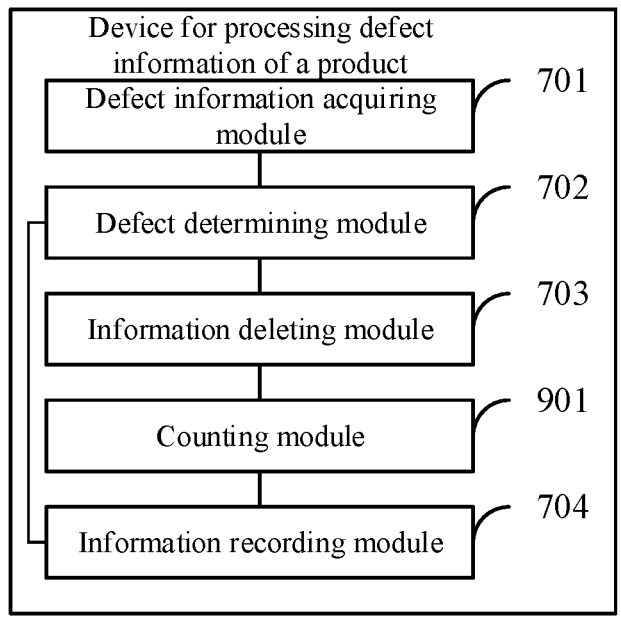
FIG. 9 shows a schematic block diagram illustrating another device for processing defect information of a product according to an embodiment of the present disclosure.

FIG. 9 shows a schematic block diagram illustrating another device for processing defect information of a product according to an embodiment of the present disclosure. As shown in FIG. 9, the device further includes:

a counting module 901, configured to count and then store at least one of the following items in the second data table:

a ratio of a number of pieces of deleted defect information on the current film layer to a total number of pieces of defect information on the current film layer;

a ratio of a number of pieces of recorded defect information on the current film layer to a total number of pieces of defect information on the current film layer; and a ratio of a number of pieces of recorded defect information on the current film layer to a number of pieces of defect information on all film layers.

In one embodiment, the data aggregating module is further configured to aggregate detected defect information according to a display panel to which detected defect information belongs.

Figure 10:
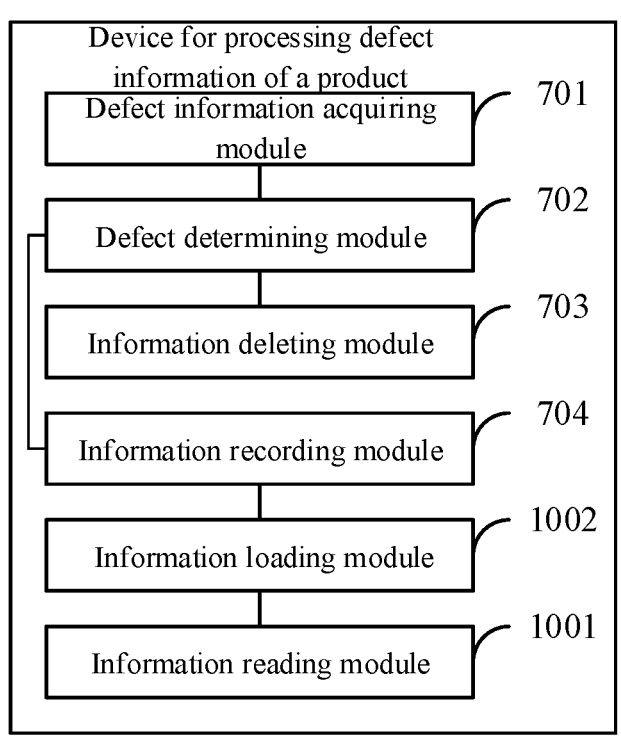
FIG. 10 shows a schematic block diagram illustrating another device for processing defect information of a product according to an embodiment of the present disclosure.

FIG. 10 shows a schematic block diagram illustrating another device for processing defect information of a product according to an embodiment of the present disclosure. As shown in FIG. 10, the device further includes:

an information reading module 1001, configured to read historical defect information recorded for the historical film layers; and an information loading module 1002, configured to load defect information detected in the current film layer into the historical defect information.

In one embodiment, the first data table and/or the second data table are data tables in a Hbase database.

In one embodiment, the rowkeys of the first data table are identifiers of display panels; and/or the rowkeys of the second data table include at least one of: factory, date, detection station, equipment, product, and defect type.

In one embodiment, the data querying module is configured to receive a query instruction sent by a client; query the second data table according to the query instruction; and generate front-end data according to a query result.

In one embodiment, the data querying module is configured to display a trend of defect information according to the query result; and/or display a distribution of the defect information according to the query result.

Figure 11:
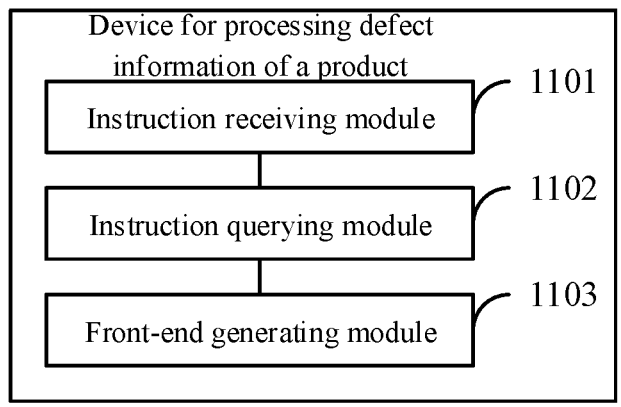
FIG. 11 shows a schematic block diagram illustrating a device for retrieving defect information of a product according to an embodiment of the present disclosure.

FIG. 11 shows a schematic block diagram illustrating a device for retrieving defect information of a product according to an embodiment of the present disclosure. The device shown in the embodiment may be configured to retrieve defect information in film layers of the product, the product includes a plurality of film layers, the product, for example, may be a display panel, and the display panel includes but not limited to an organic light-emitting diode display panel, and a liquid crystal display panel, etc.

As shown in FIG. 11, the device for retrieving defect information of a product may include:

an instruction receiving module 1101, configured to receive a query instruction sent by a client;

an instruction querying module 1102, configured to query for defect information for the plurality of film layers according to the query instruction; and a front-end generating module 1103, configured to generate front-end data according to a query result, The defect information for the plurality of film layers is determined by: acquiring defect information on the current film layer and defect information on the historical film layers, where the historical film layers were formed before formation of the current film layer; determining a target location in the current film layer for the defect information, and determining whether defect information exists for a corresponding location to the target location in any of the historical film layers; if defect information exists for the target location in at least one of the historical film layers, deleting the defect information detected at the target location in the current film layer; and if defect information exists for the target location in at least one of the historical film layers, retaining the defect information detected at the target location in the current film layer, where defect information stored in a data table include recoded defect information.

In one embodiment, if a distance between a defect location at which defect information exists in the historical film layer and the target location is less than a threshold distance, it can be determined that defect information exists at a corresponding location to the target location in the historical film layer.

In one embodiment, if a defect in a row direction exists in the current film layer, a first distance in a column direction between a defect location at which defect information exists in the historical film layer and a row of pixels corresponding to the defect in the row direction is determined; and if the distance is less than a first threshold distance, it can be determined that defect information exists at a corresponding location to the target location in the historical film layer.

In one embodiment, if a defect in a column direction exists in the current film layer, a second distance in a row direction between a defect location at which defect information exists in the historical film layer and a column of pixels corresponding to the defect in the column direction is determined; and if the distance is less than a second threshold distance, it can be determined that defect information exists at a corresponding location to the target location in the historical film layer.

In one embodiment, determining defect information for the plurality of film layers further includes: before the acquisition of defect information on the current film layer and defect information on the historical film layers, determining a defect location of the defect information on the current film layer, and information on cutting of a display panel at which the defect location is located; according to historical information on cutting, determining an association relationship between a coordinate in the display panel and a coordinate in a glass substrate at which the display panel is located before cutting; and according to the association relationship, determining a location of the defect location in the glass substrate.

Figure 12:
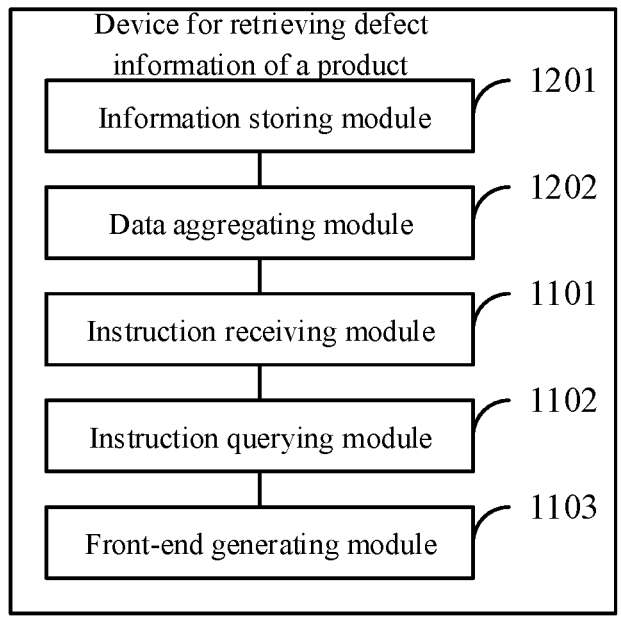
FIG. 12 shows a schematic block diagram illustrating another device for retrieving defect information of a product according to an embodiment of the present disclosure.

FIG. 12 shows a schematic block diagram illustrating another device for retrieving defect information of a product according to an embodiment of the present disclosure. As shown in FIG. 12, the device further includes:

an information storing module 1201, configured to store recorded defect information in a first data table; and a data aggregating module 1202, configured to aggregate data in the first data table according to information on processing procedures in a manufacturing process so as to obtain a second data table.

Figure 13:
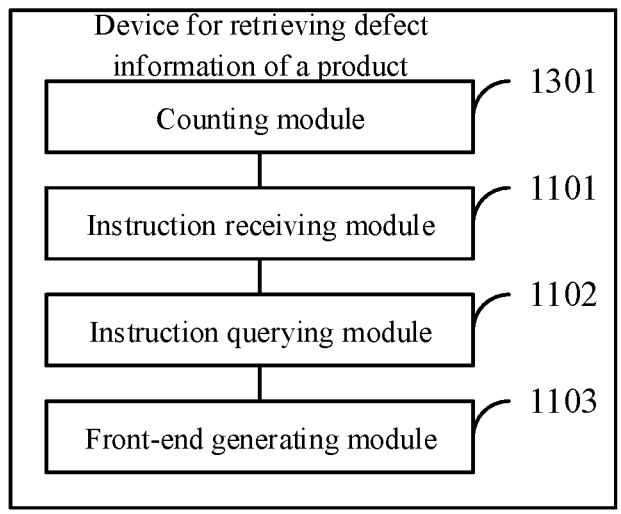
FIG. 13 shows a schematic block diagram illustrating another device for retrieving defect information of a product according to an embodiment of the present disclosure.

FIG. 13 shows a schematic block diagram illustrating another device for retrieving defect information of a product according to an embodiment of the present disclosure. As shown in FIG. 13, the device further includes:

- a counting module 1301, configured to count and then store at least one of the following items in a second data table:
- a ratio of a number of pieces of deleted defect information on the current film layer to a total number of pieces of defect information on the current film layer;
- a ratio of a number of pieces of recorded defect information on the current film layer to a total number of pieces of defect information on the current film layer; and
- a ratio of a number of pieces of recorded defect information on the current film layer to a number of pieces of defect information on all film layers.

In one embodiment, the data aggregating module is further configured to aggregate detected defect information according to a display panel to which the detected defect information belongs.

Figure 14:
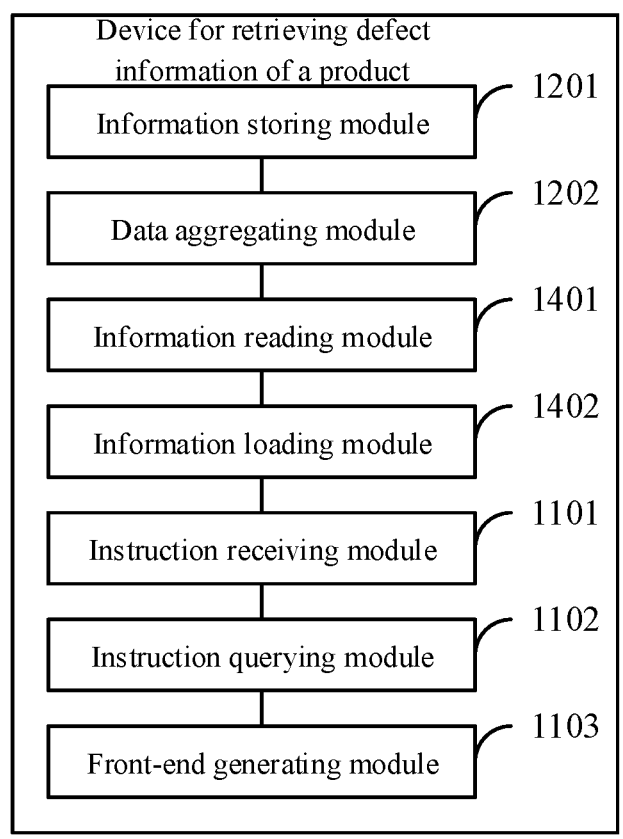
FIG. 14 shows a schematic block diagram illustrating another device for retrieving defect information of a product according to an embodiment of the present disclosure.

FIG. 14 shows a schematic block diagram illustrating another device for retrieving defect information of a product according to an embodiment of the present disclosure. As shown in FIG. 14, the device further includes:

- an information reading module 1401, configured to read historical defect information recorded for a historical film layer; and
- an information loading module 1402, configured to load defect information detected in a current film layer into the historical defect information.

In one embodiment, the first data table and/or the second data table are data tables in a Hbase database.

In one embodiment, rowkeys of the first data table are identifiers of display panels; and/or rowkeys of the second data table include at least one of: factory, date, detection station, equipment, product, and defect type.

In one embodiment, the front-end generating module is configured to display a trend of defect information according to a query result; and/or display a distribution of the defect information according to the query result.

With regard to the devices in the above-mentioned embodiments, the specific manner in which various modules therein perform operations has been described in detail in the embodiments of relevant methods, so detailed explanations will not be made here.

Since the device embodiments basically correspond to the method embodiments, reference may be made to a part of descriptions of the method embodiments. The device embodiments described above are only schematic, the modules therein introduced as separate components may or may not be physically separated, and the components shown as modules may or may not be physical modules, i.e., may be located in one place, or may be distributed on a plurality of network modules. Part or all of the modules can be selected to achieve the purpose of the solution of this embodiment according to actual needs. Those of ordinary skill in the art can understand and implement without creative efforts.

One or more embodiments of the present disclosure further provide a detection device including a processor, and a memory configured to store executable instructions of the processor, where the processor is configured to implement the method for processing defect information of a product mentioned in any one of the above-mentioned embodiments.

One or more embodiments of the present disclosure further provide an electronic device including a processor, and a memory configured to store instructions executable by the processor, where the processor is configured to implement the method for retrieving defect information of a product mentioned in any one of the above-mentioned embodiments.

One or more embodiments of the present disclosure further provide a computer-readable storage medium in which computer programs are stored, wherein the programs are executed by the processor to implement the steps in the method for processing defect information of a product mentioned in any one of the above-mentioned embodiments.

One or more embodiments of the present disclosure further provide a computer-readable storage medium in which computer programs are stored, wherein the programs are executed by the processor to implement the steps in the method for retrieving defect information of a product mentioned in any one of the above-mentioned embodiments.

Figure 15:
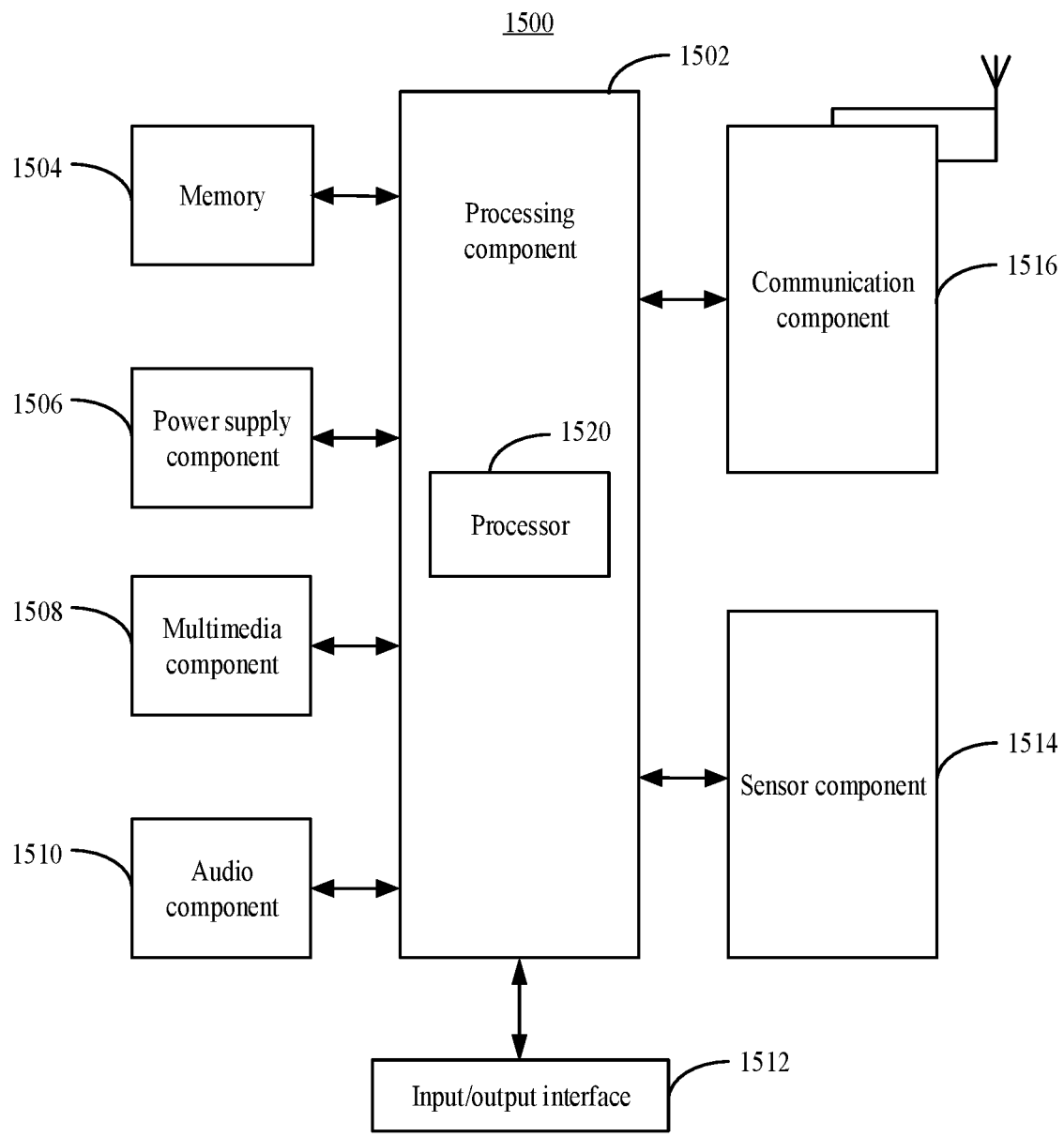
FIG. 15 shows a schematic block diagram illustrating a device for retrieving defect information according to an embodiment of the present disclosure.

FIG. 15 is a block diagram illustrating a device 1500 for retrieving defect information according to an embodiment of the present disclosure. For example, the device 1500 may be a mobile phone, a computer, a digital broadcast terminal, a message transceiver, a game console, a tablet device, a medical device, a fitness device, a personal digital assistant, and the like.

As shown in FIG. 15, the device 1500 may include one or more of the following components: a processing component 1502, a memory 1504, a power supply component 1506, a multimedia component 1508, an audio component 1510, an input/output (I/O) interface 1512, a sensor component 1514 and a communication component 1516.

The processing component 1502 generally controls overall operations of the device 1500, such as operations associated with display, phone calls, data communications, camera operations, and recording operations. The processing component 1502 may include one or more processors 1520 to execute instructions to complete all or part of the steps of the above methods. In addition, the processing component 1502 may include one or more modules which facilitate the interaction between the processing component 1502 and other components. For example, the processing component 1502 may include a multimedia module to facilitate the interaction between the multimedia component 1508 and the processing component 1502.

The memory 1504 is configured to store various types of data to support the operation of the device 1500. Examples of such data include instructions for any application or method operated on the device 1500, contact data, phonebook data, messages, pictures, videos, and so on. The memory 1504 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 1506 supplies power for different components of the device 1500. The power supply component 1506 may include a power supply management system, one or more power supplies, and other components associated with generating, managing and distributing power for the device 1500.

The multimedia component 1508 includes a screen that provides an output interface between the device 1500 and a user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some examples, the multimedia component 1508 includes a front camera and/or a rear camera. When the device 1500 is in an operation mode, such as a shooting mode or a video mode, the front camera and/or the rear camera may receive external multimedia data. Each of the front and rear cameras may be a fixed optical lens system or have a focal length and an optical zoom capability.

The audio component 1510 is configured to output and/or input audio signals. For example, the audio component 1510 includes a microphone (MIC) configured to receive an external audio signal when the device 1500 is in an operation mode, such as a call mode, a recording mode, and a voice recognition mode. The received audio signal may be further stored in the memory 1504 or transmitted via the communication component 1516. In some examples, the audio component 1510 also includes a loudspeaker for outputting an audio signal.

The I/O interface 1512 provides an interface between the processing component 1502 and a peripheral interface module which may be a keyboard, a click wheel, a button, or the like. These buttons may include, but are not limited to a home button, a volume button, a start button, and a lock button.

The sensor component 1514 includes one or more sensors for providing a status assessment in various aspects to the device 1500. For example, the sensor component 1514 may detect an open/closed state of the device 1500, and the relative positioning of components, for example, the component is a display and a keypad of the device 1500. The sensor component 1514 may also detect a change in position of the device 1500 or a component of the device 1500, the presence or absence of a user in contact with the device 1500, the orientation or acceleration/deceleration of the device 1500 and a change in temperature of the device 1500. The sensor component 1514 may include a proximity sensor configured to detect the presence of nearby objects without any physical contact. The sensor component 1514 may also include a light sensor, such as a CMOS or CCD image sensor, for use in imaging applications. In some examples, the sensor component 1514 may also include an acceleration sensor, a gyro sensor, a magnetic sensor, a pressure sensor, or a temperature sensor.

The communication component 1516 is configured to facilitate wired or wireless communication between the device 1500 and other devices. The device 1500 may access a wireless network based on a communication standard, such as WiFi, 2G or 3G, or a combination thereof. In an example, the communication component 1516 receives broadcast signals or broadcast associated information from an external broadcast management system via a broadcast channel. In an example, the communication component 1516 also includes a near field communication (NFC) module to facilitate short range communication. For example, the NFC module may be implemented based on a radio frequency identification (RFID) technology, an infrared data association (IrDA) technology, an ultrawideband (UWB) technology, a Bluetooth (BT) technology, and other technologies.

In an example, the device 1500 may be implemented by one or more application specific integrated circuits (ASICs), digital signal processors (DSPs), digital signal processing devices (DSPDs), programmable logic devices (PLDs), a field programmable gate array (FPGA), a controller, a microcontroller, a microprocessor or other electronic elements for performing the above methods.

In an example, there is also provided a non-transitory computer readable storage medium including instructions, such as a memory 1504 including instructions, where the instructions are executable by the processor 1520 of the device 1500 to perform the above method of retrieving defect information of a product. For example, the non-transitory computer readable storage medium may be Random Access Memory (RAM), Random Only Memory (ROM), CD-ROM, magnetic tape, floppy disk, optical data storage device and the like.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

It shall be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

The above are detailed descriptions of a method and an device provided according to the embodiments of the present disclosure. Specific examples are used herein to set forth the principles and the implementing methods of the present disclosure, and the descriptions of the above embodiments are only meant to help understanding of the method and the core idea of the present disclosure. Meanwhile, those of ordinary skill in the art may make alterations to the specific embodiments and the scope of application in accordance with the idea of the present disclosure. In conclusion, the contents of the present specification shall not be interpreted as limiting to the present disclosure.

The invention claimed is:

1. A method for processing defect information of a product, the product comprising a plurality of film layers, and the method comprising:
    acquiring defect information on a current film layer and defect information on historical film layers, where the historical film layers were formed before formation of the current film layer;
    determining a target location in the current film layer for the defect information, and determining whether defect information exists for a corresponding location to the target location in any of the historical film layers;

if defect information exists for the target location in at least one of the historical film layers, deleting the defect information detected at the target location in the current film layer; and if no defect information exists for the target location in any of the historical film layers, retaining the defect information detected at the target location in the current film layer;

wherein the method further comprising:

storing recorded defect information in a first data table;

aggregating data in the first data table according to information on processing procedures in a manufacturing process so as to obtain a second data table; and retrieving data in the second data table according to a received query instruction.

2. The method of claim 1, wherein determining whether defect information exists for a corresponding location to the target location in any of the historical film layers comprises:

determining whether defect information exists for a range with a preset threshold distance from the target location in any of the historical film layers; and if defect information exists, determining that defect information exists for a corresponding location to the target location in at least one of the historical film layers.

3. The method of claim 2, wherein determining whether defect information exists for a range with a preset threshold distance from the target location in any of the historical film layers comprises:

if a defect in a row direction exists in the current film layer, determining whether defect information exists for a range with the preset threshold distance in a column direction from the target location in any of the historical film layers; and if defect information exists, determining that defect information exists for a corresponding location to the target location in at least one of the historical film layers.

4. The method of claim 2, wherein determining whether defect information exists for a range with a preset threshold distance from the target location in any of the historical film layers comprises:

if a defect in a column direction exists in the current film layer, determining whether defect information exists for a range with the preset threshold distance in a row direction from the target location in any of the historical film layers; and if defect information exists, determining that defect information exists for a corresponding location to the target location in at least one of the historical film layers.

5. The method of claim 1, wherein prior to acquiring defect information on a current film layer and defect information on historical film layers, the method further comprises:

determining a defect location of the defect information on the current film layer and information on cutting of a display panel at which the defect location is located;

according to historical information on cutting, determining an association relationship between a coordinate in the display panel and a coordinate in a glass substrate at which the display panel is located before cutting;

determining a location of the defect location in the glass substrate according to the association relationship.

6. The method of claim 1, further comprising:

counting and then storing in the second data table at least one of the following items:

a ratio of a number of pieces of deleted defect information on the current film layer to a total number of pieces of defect information on the current film layer;

a ratio of a number of pieces of recorded defect information on the current film layer to a total number of pieces of defect information on the current film layer; and a ratio of a number of pieces of recorded defect information on the current film layer to a number of pieces of defect information on all film layers.

7. The method of claim 1, wherein prior to determining a target location in the current film layer for the defect information, the method further comprises:

aggregating the detected defect information according to a display panel to which the detected defect information belongs.

8. The method of claim 7, wherein prior to aggregating the detected defect information according to a display panel to which the detected defect information belongs, the method further comprises:

reading historical defect information recorded for the historical film layers; and loading the defect information detected in the current film layer into the historical defect information.

9. A method for retrieving defect information of a product, the product comprising a plurality of film layers, and the method comprising:

receiving a query instruction sent by a client;

retrieving defect information for the plurality of film layers according to the query instruction; and generating front-end data according to a query result, wherein the defect information for the plurality of film layers is determined by: acquiring defect information on a current film layer and defect information on historical film layers, where the historical film layers were formed before formation of the current film layer;

determining a target location for the defect information on the current film layer, and determining whether defect information exists for a corresponding location to the target location in any of the historical film layers; if defect information exists for the target location in at least one of the historical film layers, deleting the defect information detected at the target location in the current film layer; and if no defect information exists for the target location in any of the historical film layers, retaining the defect information detected at the target location in the current film layer; wherein defect information in a data table includes recorded defect information; and wherein prior to receiving a query instruction sent by a client, the method further comprises:

storing recorded defect information in a first data table; and aggregating data in the first data table according to information on processing procedures in a manufacturing process so as to obtain a second data table.

10. The method of claim 9, wherein if a distance between a defect location at which defect information exists in the historical film layer and the target location is less than a threshold distance, whether defect information exists at a corresponding location to the target location in the historical film layer is determined.

11. The method of claim 10, wherein if a defect in a row direction exists in the current film layer, a first distance in a column direction between the defect location at which defect information exists in the historical film layer and a row of pixels corresponding to the defect in the row direction is determined; and if the first distance is less than a first threshold distance, that defect information exists at the corresponding location to the target location in the historical film layer is determined.

12. The method of claim 10, wherein if a defect in a column direction exists in the current film layer, a second distance in a row direction between the defect location at which defect information exists in the historical film layer and a column of pixels corresponding to the defect in the column direction is determined; and if the second distance is less than a second threshold distance, that defect information exists at the corresponding location to the target location in the historical film layer is determined.

13. The method of claim 9, wherein determining the defect information for the plurality of film layers further comprises:

prior to acquiring defect information on a current film layer and defect information on historical film layers, determining a defect location of the defect information on the current film layer and information on cutting of a display panel at which the defect location is located;

according to historical information on cutting, determining an association relationship between a coordinate in the display panel and a coordinate in a glass substrate at which the display panel is located before cutting;

determining a location of the defect location in the glass substrate according to the association relationship.

14. The method of claim 9, wherein before the query instruction sent by the client is received, the method further comprises:

counting and then storing in the second data table at least one of the following items:

a ratio of a number of pieces of deleted defect information on the current film layer to a total number of pieces of defect information on the current film layer;

a ratio of a number of pieces of recorded defect information on the current film layer to a total number of pieces of defect information on the current film layer; and a ratio of a number of pieces of recorded defect information on the current film layer to a number of pieces of defect information on all film layers.

15. The method of claim 9, wherein prior to determining a target location in the current film layer for the defect information, the method further comprises:

aggregating the detected defect information according to a display panel to which the detected defect information belongs.

16. The method of claim 15, wherein prior to aggregating the detected defect information according to a display panel to which the detected defect information belongs, the method further comprises:

reading historical defect information recorded for the historical film layers; and loading the defect information detected in the current film layer into the historical defect information.

17. A system for retrieving defect information of a product, wherein the product comprises a plurality of film layers, and the system comprises a data processing device, a display device and a distributed storage device;

the distributed storage device is configured to store defect information detected in a current film layer and defect information detected in historical film layers, where the historical film layers were formed before formation of the current film layer;

the data processing device is configured to acquire the defect information detected in the current film layer from the distributed storage device, determine a target location in the current film layer for the defect information, determine whether defect information exists for a corresponding location to the target location in any of the historical film layers, delete the defect information detected at the target location in the current film layer if defect information exists for the target location in at least one of the historical film layers, retain the defect information detected at the target location in the current film layer if no defect information exists for the target location in any of the historical film layers, and store the retained defect information in the distributed storage device; and the display device is configured to retrieve defect information in the distributed storage device according to a received query instruction, and generate front-end data;

wherein the data processing device is further configured to store recorded defect information in a first data table; and carry out aggregation on data in the first data table according to information on processing procedures in a manufacturing process so as to obtain a second data table; and the display device is configured to retrieve defect information in the second data table according to the query instruction.

* * * * *